(12) United States Patent
Hayashi

(10) Patent No.: US 7,639,835 B2
(45) Date of Patent: Dec. 29, 2009

(54) INFORMATION PROCESSING APPARATUS AND ITS CONTROL METHOD, COMPUTER PROGRAM AND STORAGE MEDIUM

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 11/469,660

(22) Filed: Sep. 1, 2006

(65) Prior Publication Data
US 2006/0294385 A1    Dec. 28, 2006

Related U.S. Application Data

(62) Division of application No. 10/067,740, filed on Feb. 8, 2002, now Pat. No. 7,146,502.

(30) Foreign Application Priority Data

Feb. 9, 2001   (JP) .............................. 2001-034057
Feb. 16, 2001  (JP) .............................. 2001-040787

(51) Int. Cl.
*G06K 9/00*     (2006.01)
*H04L 9/32*     (2006.01)

(52) U.S. Cl. ...................................... 382/100; 713/176
(58) Field of Classification Search ................. 382/100, 382/232, 240; 380/51, 54, 210, 252, 287; 370/522–529; 713/176, 179; 283/72, 74–81, 283/85, 93, 113, 901, 902; 358/3.28; 725/9, 725/20, 22; 375/130

See application file for complete search history.

(56) References Cited

U.S. PATENT DOCUMENTS

| 5,606,609 | A |   | 2/1997  | Houser et al. |
|-----------|---|---|---------|---------------|
| 5,774,552 | A |   | 6/1998  | Grimmer ...................... 380/25 |
| 5,809,139 | A | * | 9/1998  | Girod et al. .................. 380/202 |
| 5,912,972 | A |   | 6/1999  | Barton |
| 6,005,936 | A | * | 12/1999 | Shimizu et al. .............. 713/176 |
| 6,278,791 | B1|   | 8/2001  | Honsinger et al. .......... 382/100 |

(Continued)

FOREIGN PATENT DOCUMENTS

CN            1266328 A        9/2000

(Continued)

OTHER PUBLICATIONS

Partial translation and Abstract of JP-A-2000-152148.

(Continued)

*Primary Examiner*—Abolfazl Tabatabai
(74) *Attorney, Agent, or Firm*—Fitzpatrick, Cella, Harper & Scinto

(57) ABSTRACT

Additional information is embedded into elements that form digital data by adding or subtracting a value to or from the elements. An element is detected which has a value that exceeds a range that the element can assume after the addition or subtraction is performed, and actual embedding information is generated by combining the additional information and the information detected in the detection step. The actual embedding information generated in the generation step is embedded into the elements, which fall with the range an element can assume, as a digital watermark, while excluding the element that exceeds the range the element can assume after the addition or subtraction is performed.

16 Claims, 21 Drawing Sheets

U.S. PATENT DOCUMENTS

| | | | |
|---|---|---|---|
| 6,330,672 B1 | 12/2001 | Shur | 713/176 |
| 6,535,616 B1 | 3/2003 | Hayashi et al. | 382/100 |
| 6,611,599 B2 | 8/2003 | Natarajan | |
| 6,693,955 B1 | 2/2004 | Arimitsu | 375/150 |
| 6,693,965 B1 * | 2/2004 | Inoue et al. | 375/240.19 |
| 6,741,758 B2 | 5/2004 | Hayashi et al. | 382/294 |
| 6,792,535 B1 | 9/2004 | Kwan | |
| 6,993,148 B1 | 1/2006 | Miyashita et al. | 382/100 |
| 7,051,207 B2 * | 5/2006 | Watanabe | 713/176 |

FOREIGN PATENT DOCUMENTS

| | | |
|---|---|---|
| JP | 11-032205 | 2/1999 |
| JP | 11-0327438 | 11/1999 |
| JP | 2000-152148 A | 5/2000 |
| JP | 2000-224402 | 8/2000 |
| JP | 2000-287066 | 10/2000 |
| JP | 3145325 B2 | 1/2001 |
| JP | 3154325 B2 | 1/2001 |
| KR | 2000-0035423 A | 6/2000 |
| WO | WO 99/17537 | 4/1999 |

OTHER PUBLICATIONS

"Techniques for data hiding" Bender, et al., Proceedings of Storage and Retrieval for Image and Video Databases III, SPIE—The International Society for Optical Engineering, Feb. 1995, San Jose, CA, vol. 2420, pp. 164-173.

"A Method for Signature Casting on Digital Images", Pitas, L.C.I.I.P. Proceedings, Sep. 1996, pp. 215-218.

Schneier, Applied Cryptography, 1996, John Wiley & Sons, 2nd Edition, pp. 30-31.

Fridrich et al, "Invertible Authentication", Security and Watermarking of Multimedia Contents III, Jan. 2001, Retrieved from the INSPEC database Sep. 16, 2005.

Hwang et al., "A Watermarking Technique Based on One-Way Hash Functions", May 1999, IEEE, Retrieved from the Internet on Aug. 11, 2006: <URL:http://ieeexplore.ieee.org/iel5/3017223/00793411.pdf?tp=&arnumber=793411&isnumber=17223>.

J. Fridrich, et al. "Invertible Authentication", Proceedings of SPIE, Security and Watermarking of Multi-Media Contents III, vol. 4314, Aug. 2001, pp. 197-208.

J. Fridrich, "Lossless Image Authentication Using Watermarking", http://cis.poly.edu/seminars/fall00/abstract4fall00.htm, Oct. 20, 2000.

W. Bender, et al., "Techniques for Data Hiding", IBM Systems Journal, vol. 35, Nos. 3 & 4, 1996, pp. 316-320.

B. Macq, "Lossless Multiresolution Transform for Image Authenticating Watermarking", Proc. EUSIPCO, Sep. 2000, pp. 1973-1976.

J. F. Delaigle, et al., "Digital Images Protection Techniques In A Broadcast Framework: An Overview" Proceedings of the European Conference on Multimedia Applications, Services, And Techniques, vol. 2, May 28, 1996, pp. 711-727.

* cited by examiner

FIG. 11

| OVERFLOW INFORMATION R | ADDITIONAL INFORMATION Inf |

FIG. 14

| 0.1 | -0.7 | -0.7 | -0.4 |
|---|---|---|---|
| -0.4 | 0.0 | -0.2 | 0.8 |
| -0.2 | 0.9 | 0.3 | 0.1 |
| 0.8 | -0.3 | 0.4 | -0.6 |

$X_i$

×

| 10 | 10 | 20 | 10 |
|---|---|---|---|
| 10 | 10 | 20 | 20 |
| 10 | 10 | 10 | 10 |
| 10 | 10 | 10 | 10 |

$\alpha_i$

+

| 118 | 112 | 51 | 49 |
|---|---|---|---|
| 119 | 120 | 50 | 49 |
| 121 | 122 | 120 | 119 |
| 120 | 122 | 121 | 119 |

$I_{i,j}$

↓

| 119 | 112 | 37 | 45 |
|---|---|---|---|
| 115 | 120 | 46 | 65 |
| 119 | 131 | 123 | 120 |
| 128 | 119 | 125 | 113 |

| 0.1 | −0.7 | −0.7 | −0.4 |
|---|---|---|---|
| −0.4 | 0.0 | −0.2 | 0.8 |
| −0.2 | 0.9 | 0.3 | 0.1 |
| 0.8 | −0.3 | 0.4 | −0.6 |

×

$\alpha_i$

| 10 | 10 | 20 | 10 |
|---|---|---|---|
| 10 | 10 | 20 | 20 |
| 10 | 10 | 10 | 10 |
| 10 | 10 | 10 | 10 |

+

$I_{i,j}$

| 250 | 252 | 55 | 57 |
|---|---|---|---|
| 252 | 251 | 52 | 60 |
| 250 | 251 | 250 | 249 |
| 245 | 250 | 249 | 250 |

↓

| 251 | 245 | 41 | 53 |
|---|---|---|---|
| 248 | 251 | 48 | 76 |
| 248 | 261 | 254 | 251 |
| 262 | 250 | 254 | 243 |

→

$I'_{i,j}$

| 251 | 245 | 41 | 53 |
|---|---|---|---|
| 248 | 251 | 48 | 76 |
| 248 | 255 | 254 | 251 |
| 255 | 250 | 254 | 243 |

FIG. 20

| CORRECTION INFORMATION C | OVERFLOW INFORMATION R | ADDITIONAL INFORMATION Inf |

INFORMATION PROCESSING APPARATUS AND ITS CONTROL METHOD, COMPUTER PROGRAM AND STORAGE MEDIUM

This application is a division of application Ser. No. 10/067,740 filed Feb. 8, 2002.

FIELD OF THE INVENTION

The present invention relates to an information processing method and apparatus for signing and authenticating digital information, and a storage medium.

BACKGROUND OF THE INVENTION

In recent years, computers and networks have advanced remarkably, and many kinds of digital information such as text data, image data, audio data, and the like are available. Such digital information is free from deterioration due to, e.g., aging, and can be permanently saved in a perfect condition. Also, digital information can be easily edited and processed. It is often advantageous for the user to edit and process digital data.

However, in insurance companies which use evidence photos in accident processes or in construction companies that record progresses of construction sites, the reliability of digital data is lower than analog data, and digital data is weak as an evidence.

Hence, a video input apparatus and system for detecting any tampering and/or forgery of digital data have been proposed.

For example, a system that exploits a digital signature is well known as the system for detecting any tampering and/or forgery. A digital signature will be briefly explained below.

Upon using a digital signature, a sender sends signature data corresponding to data together with the data, and a receiver checks the authenticity of the data by verifying the signature data. The authenticity of data is checked as follows using a digital signature generated using a Hash function and public key cryptography.

Let Ks be a secret key, and Kp be a public key. Then, a sender makes an arithmetic operation for calculating an output h with a given length (e.g., 128 bits) by compressing plaintext data M by a Hash function. The sender then makes an arithmetic operation for generating digital signature data s by converting h using the secret key Ks, i.e., $D(Ks, h)=s$. After that, the sender sends the digital signature data s and plaintext data M.

On the other hand, a receiver makes an arithmetic operation for converting the received digital signature data s using the public key Kp, i.e., $E(Kp, s)=E(Kp, D(Ks, h''))=h''$, and an arithmetic operation for calculating h' by compressing the received plaintext data M by the same Hash function as the sender. If h' and h'' match, the receiver determines that received data M' is authentic.

If the plaintext data M has been tampered with between the sender and receiver, $E(Kp, s)=E(Kp, D(Ks, h''))=hh''$ does not match h' obtained by compressing the received plaintext data M' using the same Hash function as the sender, thus detecting tampering.

If the digital signature data s is tampered with in correspondence with tampering of plaintext data M, tampering can no longer be detected. However, in this case, plaintext data M must be calculated from h, and it is impossible to make such calculation due to unidirectionality of the Hash function. As described above, data can be correctly authenticated by the digital signature using public key cryptography and Hash function.

The Hash function will be explained below. The Hash function is used to generate a digital signature and the like at high speed. The Hash function has a function of processing plaintext data M with an arbitrary length to output an output h with a given length. Note that the output h is called a Hash value (or message digest, digital fingerprint) of the plaintext data M. The Hash function is required to have unidirectionality and collision resistance. The unidirectionality means that if h is given, it is computationally infeasible to calculate plaintext data M that satisfies $h=H(M)$. The collision resistance means that if plaintext data M is given, it is computationally infeasible to calculate plaintext data M' ($M \neq M'$) that satisfies $H(M)=H(M')$, and it is computationally infeasible to calculate plaintext data M and M' that satisfy $H(M)=H(M')$ and $M \neq M'$.

As the Hash function, MD-2, MD-4, MD-5, SHA-1, RIPEMD-128, RIPEMD-160, and the like are known, and these algorithms are open to the public.

Public key cryptography will be explained below. In public key cryptography, encrypt and decrypt keys are different, the encrypt key is open to the public, and the decrypt key is held in secrecy. As features of public key cryptography, (a) since the encrypt and decrypt keys are different and the encrypt key can be open to the public, the encrypt key need not be delivered in secrecy, and key delivery is easy;

(b) since the encrypt key of each user is open to the public, the user need only store his or her decrypt key in secrecy; and (c) an authentication function used by the receiver to authenticate if the sender of a message is a disguised person and that message is not tampered with can be implemented.

For example, if encryption of plaintext data M using a public encrypt key Kp is given by $E(Kp, M)$ and decryption using a secret decrypt key Ks is given by $D(Ks, M)$, the public key cryptography algorithm satisfies the following two conditions.

(1) If Kp is given, it is easy to calculate $E(Kp, M)$. If Ks is given, it is easy to calculate $D(Ks, M)$.

(2) If Ks is unknown, it is computationally infeasible to determine M even if the calculation procedures of Kp and E and $C=E(Kp, M)$ are known.

If the following condition (3) is met in addition to the above conditions (1) and (2), a secret communication can be implemented.

(3) $E(Kp, M)$ can be defined for all plaintext data M, and $D(Ks, E(Kp, M))=M$. That is, since Kp is open to the public, everyone can calculate $E(Kp, M)$, but only a person who has the secret key Ks can obtain M by calculating $D(Ks, E(Kp, M))$. If the following condition (4) is met in addition to the conditions (1) and (2), an authentication communication can be implemented.

(4) $D(Ks, M)$ can be defined for all plaintext data M, and $E(Kp, D(Ks, M))=M$. That is, only a person who has the secret key Ks can calculate $D(Ks, M)$, and if a third party disguises himself or herself as that person who has the secret key Ks by calculating $D(Ks', M)$ using a false secret key Ks', since $E(Kp, D(Ks', M)) \neq M$, the receiver can confirm that the received information is an illicit one. Also, even when $D(Ks, M)$ has been tampered with, since $E(Kp, D(Ks, M)') \neq M$, the receiver can confirm that the received information is an illicit one.

As typical examples that can make the secret and authentication communications, RSA cryptography, R cryptography, W cryptography, and the like are known.

Encryption and decryption of RSA cryptography which is most prevalently used today are given by:

Encryption: encrypt key (e, n) Encrypt conversion $C=M^e$ (mod n)

Decryption: decrypt key (d, n) Decrypt conversion $M=C^d$ (mod n)

n=p·q (where p and q are large different prime numbers)

As described above, since the RSA cryptography requires power and remainder arithmetic operations in both encryption and decryption, a huge arithmetic operation volume is required compared to common key cryptography such as DES or the like, and it is difficult to attain high-speed processing.

As described above, detection of tampering and/or forgery in the prior art requires a digital signature in addition to digital data. Normally, a digital signature is sent while being appended to a header of digital data. However, the appended digital signature may be easily removed by format conversion of digital data. If the digital signature is removed, digital data cannot be authenticated.

A method which can solve the above problem is disclosed in Japanese Patent Laid-Open No. 10-164549. In Japanese Patent Laid-Open No. 10-164549, digital information is broken up into two fields, a digital signature is generated from the segmented first field, and the generated digital signature is embedded into the segmented second field as a digital watermark, thus generating signed digital information. On the other hand, an authentication apparatus breaks up the signed digital information into first and second fields, generates a first digital signature from the first field, and extracts a second digital signature embedded as the digital signature from the second field. If the first and second digital signatures match, it is authenticated that the digital information is free from tampering and/or forgery.

As described above, in order to authenticate digital data, it is important to set authentication information inseparable from digital information. In the method disclosed in Japanese Patent Laid-Open No. 10-164549, since signature information is embedded as a digital watermark to authenticate an original image, and the digital watermark cannot be removed, an original image cannot be obtained. Some applications and users may determine embedding itself of the digital watermark as "tampering".

SUMMARY OF THE INVENTION

The present invention has been made in consideration of the aforementioned problems, and has as its object to provide an information processing apparatus and its control method, a computer program, and a storage medium, which can determine if digital information has been tampered with, while setting authentication information inseparable from the digital information, and can restore original digital information as long as the digital information is not tampered with.

In order to achieve the above object, for example, an information processing apparatus that appends authentication information according to the present invention comprises the following arrangement.

That is, an information processing apparatus for embedding authentication information into digital information, comprises:

means for generating authentication information on the basis of the digital information to which the authentication information is to be embedded; and digital watermarking means for embedding the generated authentication information into the digital information with the digital information being restorable.

On the other hand, an information processing apparatus that authenticates information comprises the following arrangement.

That is, an information processing apparatus for authenticating digital information in which authentication information is embedded as a digital watermark, comprises:

means for extracting, as first authentication information, the authentication information embedded as the digital watermark from the digital information;

digital watermark removal means for removing the extracted authentication information from the digital information as the digital watermark, and restoring tentative original digital information;

generation means for generating second authentication information on the basis of the tentative original digital information restored by removing the digital watermark by the digital watermark removal means; and comparison means for comparing the first authentication information and second authentication information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 shows an example of a code sequence w in another embodiment of the present invention;

FIG. 14 shows the contents of a process for embedding a digital watermark;

FIG. 16 shows an example wherein overflow has occurred upon embedding a digital watermark;

FIG. 20 shows an example of a code sequence w in still another embodiment of the present invention.

DETAILED DESCRIPTION OF THE PREFERRED EMBODIMENTS

Preferred embodiments of the present invention will be described in detail hereinafter with reference to the accompanying drawings.

A signature apparatus as an apparatus for embedding authentication information into information, and an authentication apparatus as an apparatus for authenticating that information will be explained.

<Signature Apparatus>

A signature apparatus of this embodiment will be described below with reference to FIG. 2.

Figure 2:
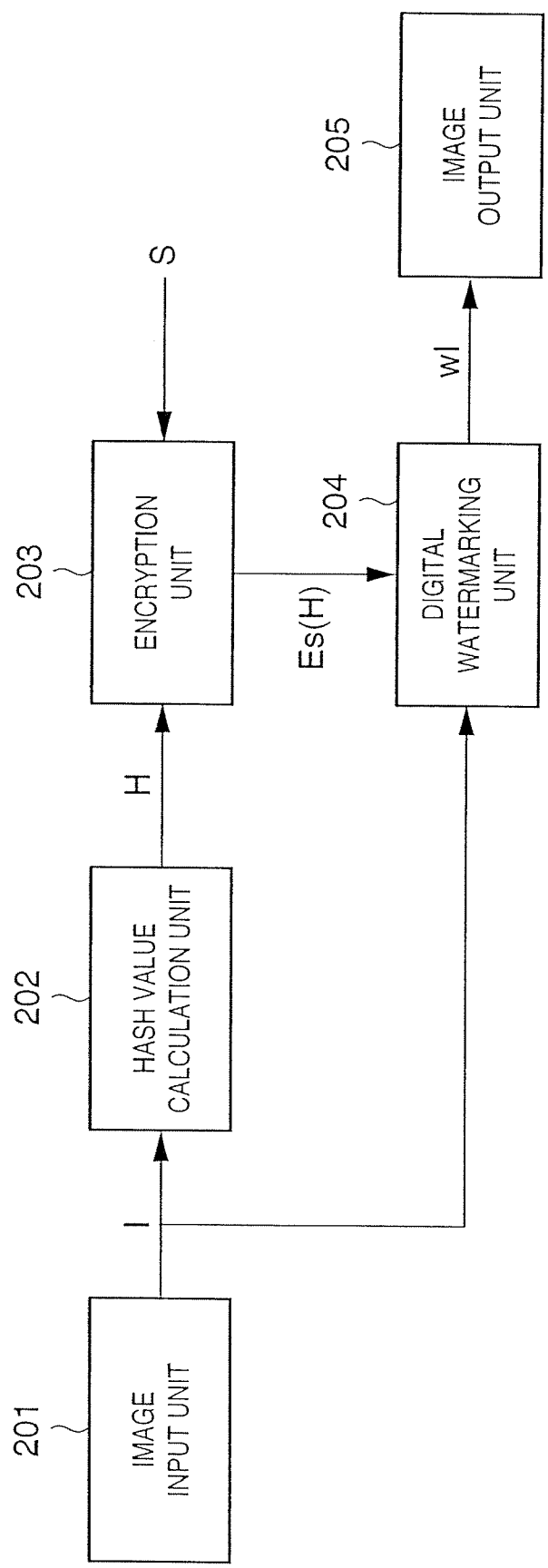
FIG. 2 is a block diagram of a signature apparatus in the embodiment of the present invention.

Referring to FIG. 2, reference numeral 201 denotes an image input unit; 202, a Hash value calculation unit; 203, an encryption unit; 204, a digital watermarking unit; and 205, an image output unit.

An image signal is input to the image input unit 201 in a raster-scan order. The input source of the image input unit 201 may be any of an image scanner, a storage medium that stores an image, a communication means that receives an image via communications from a remote plate, and the like. In the following description, an image signal expresses a monochrome multi-valued image. If the image signal expresses an image such as a color image or the like having a plurality of color components, each of R, G, and B color components or each of luminance and chromaticity components may be processed as the monochrome component.

An input image signal I is output to the Hash value calculation unit 202 and digital watermarking unit 204.

The Hash value calculation unit 202 calculates and outputs a Hash value H of the input image signal I. A Hash function is used to calculate the Hash value H. The present invention is not limited to a specific Hash function, and various algorithms such as MD-2, MD-4, MD-5, SHA-1, RIPEMD-128, RIPEMD-160, and the like, which are open to the public, may be used. The calculated Hash value H is output to the encryption unit 203.

The encryption unit 203 encrypts the input Hash value H using a secret key S, and outputs the encrypted Hash value. The present invention is not limited to any specific encryption algorithm used to encrypt, and RSA cryptography or the like as public key cryptography may be used. An encrypted Hash value Es(H) is output to the digital watermarking unit 204.

The digital watermarking unit 204 embeds the encrypted Hash value Es(H) into the input image signal I as a reversible digital watermark, and outputs the image signal (reversible digital watermarking will be described in detail later). An image signal wI embedded with the digital watermark is output to the image output unit 205. The output target is not particularly limited and the image signal may be output to a storage medium, communication line, and the like.

<Authentication Apparatus>

An authentication apparatus of this embodiment will be described below using FIG. 3.

Figure 3:
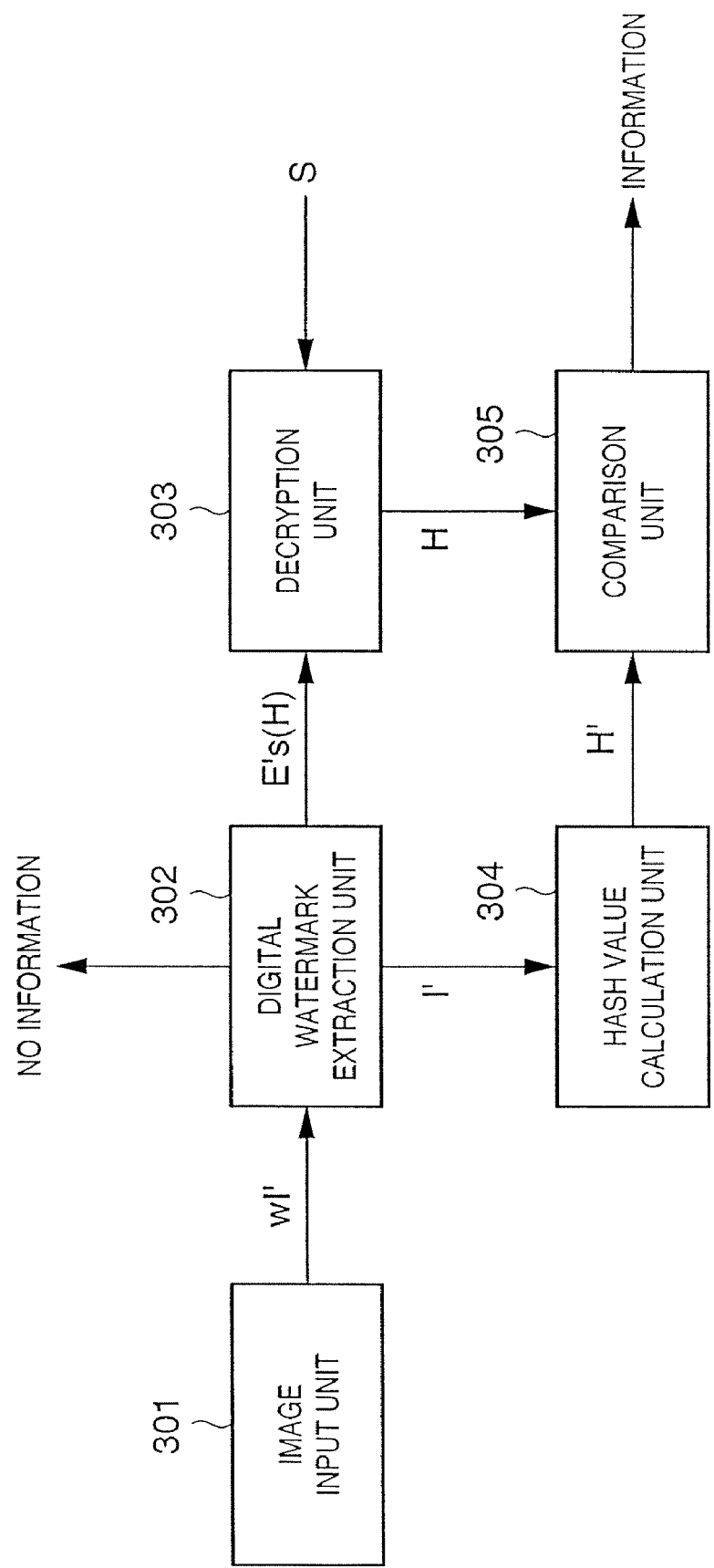
FIG. 3 is a block diagram of an authentication apparatus in the embodiment of the present invention.

Referring to FIG. 3, reference numeral 301 denotes an image input unit; 302, a digital watermark extraction unit; 303, a decryption unit; 304, a Hash value calculation unit; and 305, a comparison unit.

An image signal wI' is input to the image input unit 301 in a raster-scan order. The input image wI' is output to the digital watermark extraction unit 302. Note that wI' is preferably equal to the output wI of the signature apparatus shown in FIG. 2, but the input image signal is expressed by wI' since it may have been tampered with or forged.

The digital watermark extraction unit 302 extracts an embedded digital watermark E's(H) from the input image signal wI', and removes the reversible digital watermark. The extracted digital watermark E's(H) and image data I' from which the digital watermark has been removed are output.

If wI' is equal to WI, Es(H) is extracted as a digital watermark (that is, Es(H)=E's(H)). Furthermore, in this case, the reversible digital watermark is completely removed, and image data I is output (that is, I=I'). On the other hand, if wI' is different from wI, data different from Es(H) is output as a digital watermark (that is, Es(H)≠E's(H)). Furthermore, in this case, the reversible digital watermark is not completely removed (that is, I≠I').

Also, the digital watermark extraction unit 302 has a function of detecting if a digital watermark is embedded in the input image. Using this function, if image data in which no digital signature is embedded as a digital signal is input as wI', the digital watermark extraction unit outputs "no information", and does not execute an authentication process later. In this case, a message "image data cannot be authenticated" may be output using, e.g., a monitor.

The extracted digital watermark E's(H) is output to the decryption unit 303, and the image data I' from which the digital watermark has been removed is output to the Hash value calculation unit 304.

The decryption unit 303 decrypts and outputs the input data E's(H). Upon decryption, a public key p corresponding to the secret key s used in the signature apparatus is used. The decrypted data H is output to the comparison unit 305.

The Hash value calculation unit 304 calculates and outputs a Hash value H' of the input image data I'. As a Hash function used to calculate the Hash value, a Hash function equal to that used in the signature apparatus is used. The calculated Hash value H' is output to the comparison unit 305.

The comparison unit 305 compares the input Hash values H and H' to verify if wI' has been tampered with or forged. If H and H' are equal to each other, wI=wI', i.e., it is determined that the input data is not tampered with or forged. On the other hand, if H and H' are different from each other, wI≠wI', i.e., it is determined that the input data has been tampered with or forged. In this case, a message indicating this is displayed on a display device.

<Digital Watermarking Unit>

Details of the digital watermarking unit 204 of this embodiment will be explained below. To briefly explain a process, the digital watermarking unit embeds information so that image data before a digital watermark is embedded is completely restored.

Figure 4:
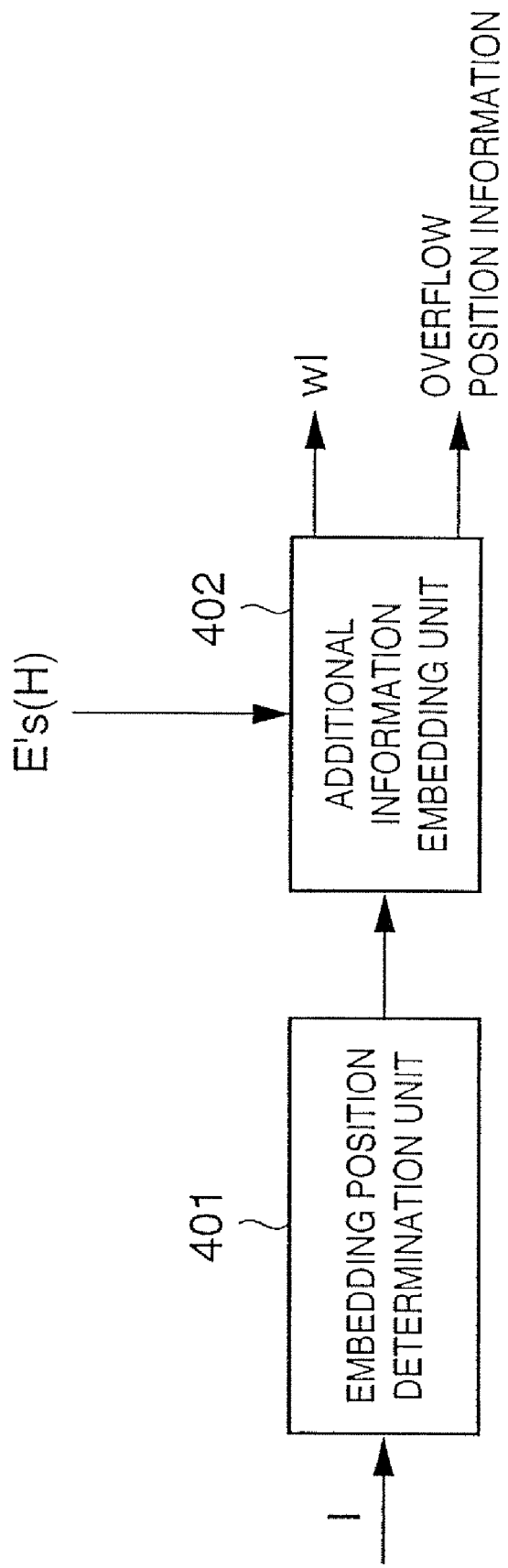
FIG. 4 is a block diagram showing details of a digital watermarking unit shown in FIG. 2.

FIG. 4 shows an internal arrangement of the digital watermarking unit 204. The flow of the process will be explained below with reference to FIG. 4.

Image data I is input to the digital watermarking unit 204, and an embedding position determination unit 401 determines an embedding position of a digital watermark to be embedded into the image data I. The image data I is input to an additional information embedding unit 402, and a digital watermark is embedded at the position determined by the embedding position determination unit 401 in accordance with information Es(H) to be appended.

For this purpose, the embedding position determination unit 401 outputs the input image data I and data (coordinates and size that specify each region) indicating the position of an image where additional information Es(H) is to be embedded to the additional information embedding unit 402.

The additional information embedding unit 402 receives additional information Es(H) (information of a plurality of bits) in addition to the image data I. The additional information Es(H) is embedded at the determined embedding position of the image data I using a digital watermarking technique. Embedding of the additional information Es(H) using the digital watermarking technique will be explained later. The additional information embedding unit 402 outputs digital watermarked data wI embedded with the additional information Es(H).

In this embodiment, data input to the digital watermarking apparatus is grayscale image data having 8-bit grayscale precision per pixel (256 gray levels) for the sake of simplicity. However, input data may be color image data. When a color image is input, a similar embedding process can be done using pixel values of one channel of the color image or luminance values of the color image.

When audio data is input, two-dimensional position information of an image may be considered as one-dimensional information of time, and the same implementation scheme may be used. When moving image data is input, since it can be considered as a plurality of two-dimensional images arranged along the time axis, each two-dimensional image can be processed by the same scheme, and the present invention can be basically applied. Hence, the scope of the present invention includes a case wherein a digital watermark is to be embedded into a color image, audio, and moving image.

The basic principle of embedding and separation (extraction) of a digital watermark in this embodiment will be described below.

<Patchwork Method>

This embodiment uses a principle called a patchwork method to embed additional information Inf (corresponding to Es(H) in the above embodiment). The patchwork method is disclosed in, e.g., Walter Bender, Daniel Gruhl, Norishige Morimoto, & Anthony Lu, "Data Hiding Technique that Supports Digital Watermarking (Vol. 1)", *Nikkei Electronics*, Feb. 24, 1997, and the like. The principle of the patchwork method will be explained first.

In the patch work method, additional information Es(H) can be embedded by statistically deviating an image.

Figure 5:
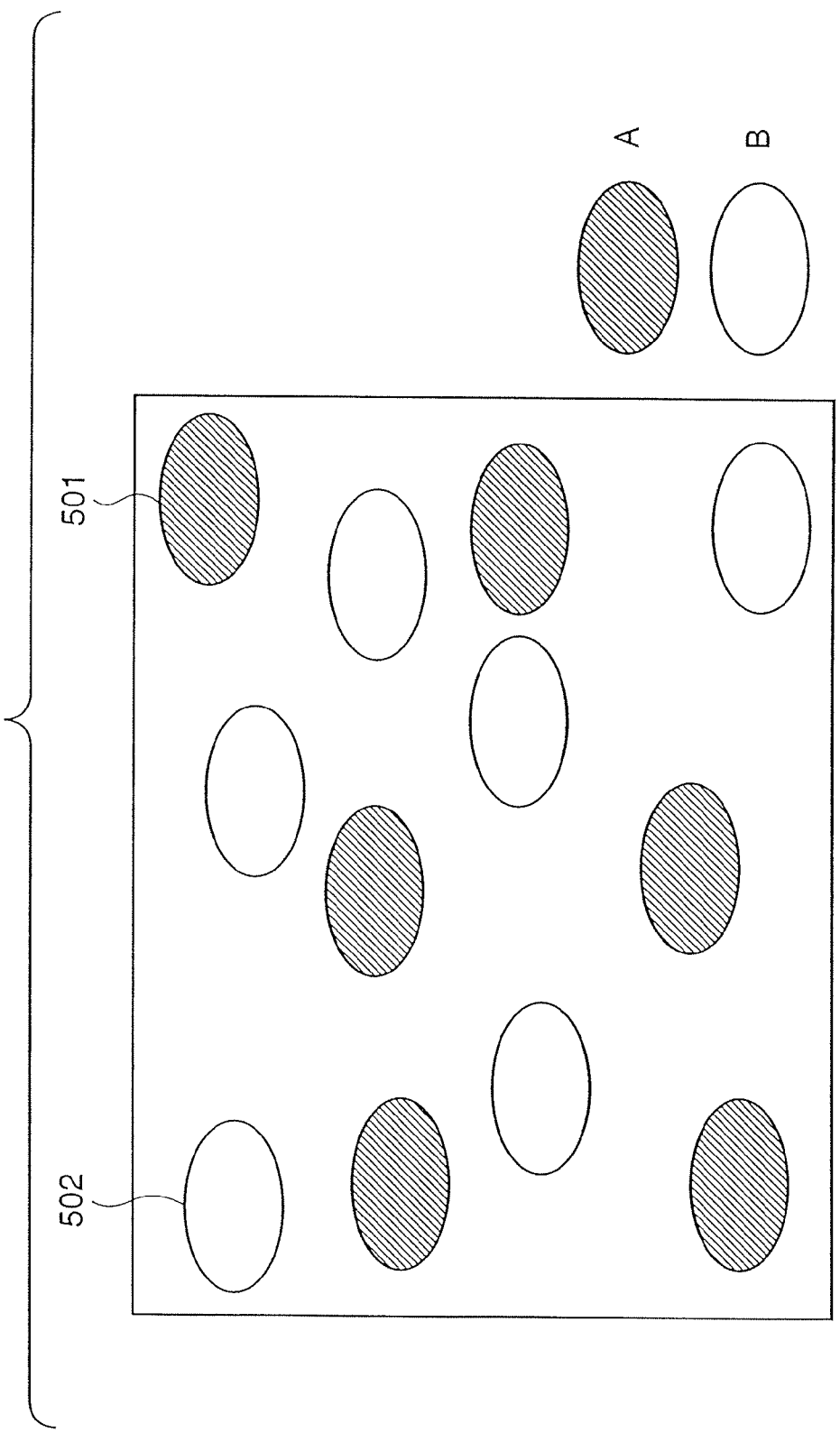
FIG. 5 is a view for explaining the principle of a patchwork method.

The principle of the patchwork method will be explained below using FIG. 5. In FIG. 5, two subsets A and B are selected from an original image. Assume that subset A is made up of a plurality of subsets represented by subset $a_i$ 501, and subset B is made up of a plurality of subsets represented by subset $b_i$ 502.

If these two subsets do not overlap each other, additional information Inf can be embedded by the patchwork method of this embodiment.

Assume that each of subsets A and B consists of N elements ($A=\{a_1, a_2, \ldots, a_N\}$, $B=\{b_1, b_2, \ldots, b_N\}$). Elements $a_i$ and $b_i$ of subsets A and B represent pixels having pixel values or a set of such pixels.

The next index d is defined by:

$$d = 1/N \cdot \Sigma(a_i - b_i)$$

where $\Sigma$ is the sum for i=1 to N.

This indicates the expected value of the difference between the pixel values of the two sets.

When appropriate subsets A and B are selected from a general natural image and index d is defined, if N is a sufficiently large value, we have:

$$d \approx 0$$

This d will be referred to as a reliability distance hereinafter.

On the other hand, as an embedding operation of respective bits which form additional information Es(H), for example, when bit information "1" is to be embedded, manipulations $$a'_i = a_i + c$$

$$b'_i = b_i - c$$

are made. These operations add "c" to the pixel values of all elements of subset A and subtract "c" from the pixel values of all elements of subset B. In this embodiment, the value "c" will be referred to as an "embedding depth" hereinafter.

As in the above case, when subsets A and B are selected from an image embedded with additional information Es(H), index d is:

$$\begin{aligned}d &= 1/N \cdot \Sigma(a_i - b_i) \\ &= 1/N \cdot \Sigma\{(a_i + c) - (b_i - c)\} \\ &= 1/N \cdot \Sigma\{(a_i - b_i) + 2c\} \\ &\approx 2c\end{aligned}$$

($\Sigma$ is the sum total for i=1 to N)

That is, the index d assumes a value separated from 0 by a given distance.

In order to embed the other bit information (bit information "0"), manipulations $$a'_i = a_i - c$$

$$b'_i = b_i + c$$

are made. Then, the reliability distance d is:

$$\begin{aligned}d &= 1/N \cdot \Sigma(a_i - b_i) \\ &= 1/N \cdot \Sigma\{(a_i - c) - (b_i + c)\} \\ &= 1/N \cdot \Sigma\{(a_i - b_i) + 2c\} \\ &\approx -2c\end{aligned}$$

That is, the distance d assumes a value separated from 0 by a given distance in the negative direction.

When a certain image is given, whether or not additional information is embedded into the image can be determined by calculating the reliability distance d of the image.

That is, if the reliability distance $d \approx 0$, no additional information Es(H) is embedded; if the reliability distance d assumes a positive value a predetermined value or more larger than 0, bit information "1" is embedded; and if d assumes a negative value a predetermined value or less smaller than 0, bit information "0" is embedded.

In this embodiment, a plurality of pieces of bit information are embedded into a single image by exploiting the principle of the aforementioned patchwork method.

In this embodiment, additional information Es(H) consisting of a plurality of bits is embedded by assuming not only a combination of subsets A and B but also a plurality of combinations of subsets A' and B', A" and B", . . . in different regions of a single image. Note that the layouts of subsets A and B, A' and B', A" and B", . . . must not overlap each other.

A method of extracting bit information from data embedded with a plurality of pieces of bit information will be examined below.

Figure 6:
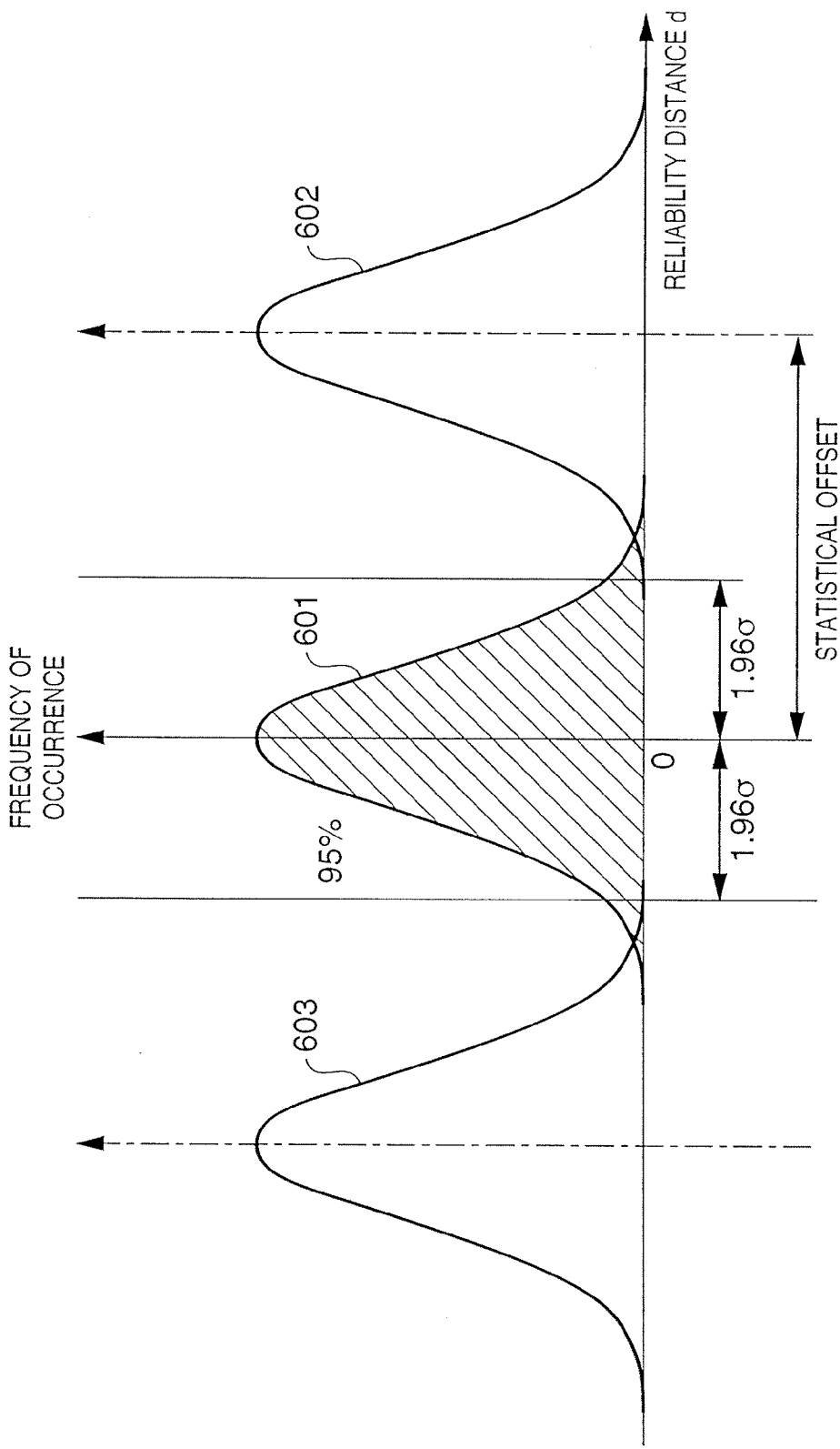
FIG. 6 shows the appearance frequency distribution of a reliability distance d upon extracting a digital watermark.

Reference numeral 601 in FIG. 6 denotes the distribution of reliability distance d calculated from data in which no digital watermark is embedded. The distribution 601 indicates the value of reliability distance d which is more likely to appear as the distribution of the frequency of occurrence corresponding to the position of reliability distance d is larger.

Distributions 602 and 603 are respectively those of reliability distance d calculated from data embedded with bit information "1" and bit information "0". Likewise, each of the distributions 602 and 603 indicates the value of reliability distance d which is more likely to appear as the distribution of the frequency of occurrence corresponding to the position of reliability distance d is larger. Note that one reliability distance d corresponds to one bit information.

All the distributions 601, 602, and 603 in FIG. 6 are normal distributions. The reason why such normal distributions are formed will be explained below using the central limiting theorem.

<Central Limiting Theorem>

This theorem reveals that when an arbitrary sample with size $n_c$ from a population (need not be a normal distribution) which has a mean $m_c$ and standard deviation $\sigma_c$, a distribution having a sample mean $S_c$ approaches a normal distribution $N(m_c, s_c/\sqrt{n_c})^2$ with increasing $n_c$.

In general, the standard deviation $\sigma_c$ of the population is unknown. However, if the number $n_c$ of samples is sufficiently large, and the number $N_c$ of populations is further sufficiently larger than the number $n_c$ of samples, a standard deviation $S_c$ of samples may be used in place of $\sigma_c$ in practice.

In this embodiment, each of subsets A and B consists of N elements ($A=\{a_1, a_2, \ldots, a_N\}$, $B=\{b_1, b_2, \ldots, b_N\}$), and these sets are pixel values having elements of subsets A and B, as shown in FIG. 5. An expected value of the reliability distance d ($\Sigma(a_i-b_i)/N$) becomes zero if N assumes a sufficiently large value and pixel values $a_i$ and $b_i$ have no correlation. As can be seen from the central limiting theorem, the reliability distance d forms a normal distribution.

Therefore, upon determining embedded bit information from the reliability distance d, an appropriate threshold value is introduced between zero and reliability distance $2c$, and when the absolute value of the reliability distance is larger than the threshold value, it is determined that information is embedded, thus achieving sufficiently statistically reliable extraction of information.

For example, let $\sigma$ be the standard deviation of the normal distribution 601. Then, if no additional information is embedded, the reliability distance d appears at a probability of 95% within the range of $-1.96\sigma$ to $+1.96\sigma$ (95% reliability range) indicated by hatching in FIG. 6.

Therefore, the probability of reliability distance d that appears outside the threshold value range lowers with increasing threshold value, and highly reliable information can be extracted.

On the other hand, if a large embedding depth "c" is set, the normal distributions 602 and 603 are separated away from the distribution 601, and a large threshold value can be set.

If the number N of elements of subsets A and B is large, standard deviation $\sigma$ of the normal distributions 601, 602, and 603 becomes small, and higher reliability is assured if the embedding depth c remains the same.

The basic idea of the patchwork method has been explained.

In this embodiment, the digital watermarking unit 204 and digital watermark extraction unit 30 use the aforementioned patchwork method.

Practical digital watermark embedding, extraction, and removal methods will be explained below.

<Embedding Position Determination Unit>

Since the patchwork method embeds additional information consisting of a plurality of bits, subsets A and B are required for each bit information. Hence, the positions of A and B, A' and B', A" and B', . . . must be determined to embed a plurality of pieces of bit information.

The embedding position determination unit 401 in FIG. 4 determines embedding positions required to embed a plurality of pieces of bit information. As a simple determination method of the embedding positions, a method of determining the positions using random numbers may be used. A plurality of bits are preferably embedded with a good balance into the entire image so that elements of respective subsets are nearly equally distributed and subsets do not overlap each other.

For example, a method using a white noise mask having the same size as an image will be briefly explained.

A white noise mask is formed by two-dimensionally arranging mask pixels, each of which has a coefficient ranging from 0 to 255. Each of coefficients 0 to 255 of the white noise mask is assigned nearly the same number of mask pixels.

For example, when an original image has 2000×2000 pixels (=4000000 pixels), since a white noise mask having the same number of mask pixels as the number of pixels of the original image is prepared, there are 15625 (=4000000/256) mask pixels having a value "0". Such mask pixels are randomly distributed to form the white noise mask.

Therefore, upon embedding 1-bit additional information, when mask pixels having odd gray levels are assigned to subset A, and mask pixels having even gray levels are assigned to subset B, subsets A and B consist of the same number of elements and do not overlap each other, and the additional information can be embedded with a good balance into the entire image.

Upon embedding a plurality of (M) pieces of bit information, pixels are equally assigned to each bit information (1 to M) (for example, the range the white noise mask can assume is divided by 2M, and the remainder is evenly assigned to subset A or B), thus embedding a plurality of pieces of bit information.

If each pixel is expressed by 8 bits, since the number of gray levels is 256, the maximum number M of bits that can be embedded is 128. This maximum value is sufficient for only a Hash value (64 or 128 bits), but if another information (e.g., copyright protection information) is to be added, that value may be insufficient. However, when an original image is segmented into four blocks, and white noise masks are set for respective segmented blocks, 128×4=512 bits can be embedded. If the number of segmented blocks is set to be larger than 4, the number of bits that can be embedded can be increased. However, if the number of segmented blocks increases, since a normal distribution is harder to form, extraction of embedded information may fail more often. Therefore, the number of segmented blocks can be determined in correspondence with the original image size.

Hence, the embedding position determination unit need only generate mask patterns prepared in advance. Note that the same masks used in embedding are prepared on the side which extracts and separates a digital watermark, and are used.

<Additional Information Embedding Unit>

The additional information embedding unit 402 receives image data I, additional information Es(H), and the embedding positions corresponding to respective bits, which are determined by the embedding position determination unit 401, as described above.

The pixel values of pixels of subsets A and B corresponding to each bit are manipulated in accordance with bit information which forms the input additional information Es(H).

As described in the paragraphs of the patchwork method, if bit information is "1", "c" is added to the pixel values of pixels of subset A, and "c" is subtracted from the pixel values of pixels of subset B. If bit information is "0", "c" is subtracted from the pixel values of pixels of subset A, and "c" is added to the pixel values of pixels of subset B. The additional information embedding unit 402 embeds additional information Es(H) by the aforementioned manipulation.

Additional information can be embedded by the aforementioned method. However, if the above method is executed, embedded pixel values $a_i'$ and $b_i'$ of pixels, which satisfy $c > a_i$ or $a_i > 255-c$ and $c > b_i$ or $b_i > 255-c$, become $a_i'$ $(b_i') < 0$ or $a_i'$ $(b_i') > 255$. Hence, a digital watermark removal unit (to be described later) cannot restore pixels (i.e., $a_i$ and $b_i$) of an original image at these pixel positions.

Hence, this embodiment executes an embedding process for pixels within the ranges $c \leq a_i \leq 255-c$ and $c \leq b_i \leq 255-c$, and does not execute any embedding for pixel values falling outside these ranges. Hence, in the above description, "the range that the white mask noise can assume is divided by 2M" upon embedding M bits, but those ranges must be excluded in advance. Note that the position information of pixels which do not undergo the embedding process must be output as overflow position information and input to the digital watermark extraction unit and digital watermark removal unit (to be described later).

<Digital Watermark Extraction Means>

The digital watermark extraction unit 302 in this embodiment will be explained below. The digital watermark extraction unit 302 has an arrangement shown in, e.g., FIG. 7.

Figure 7:
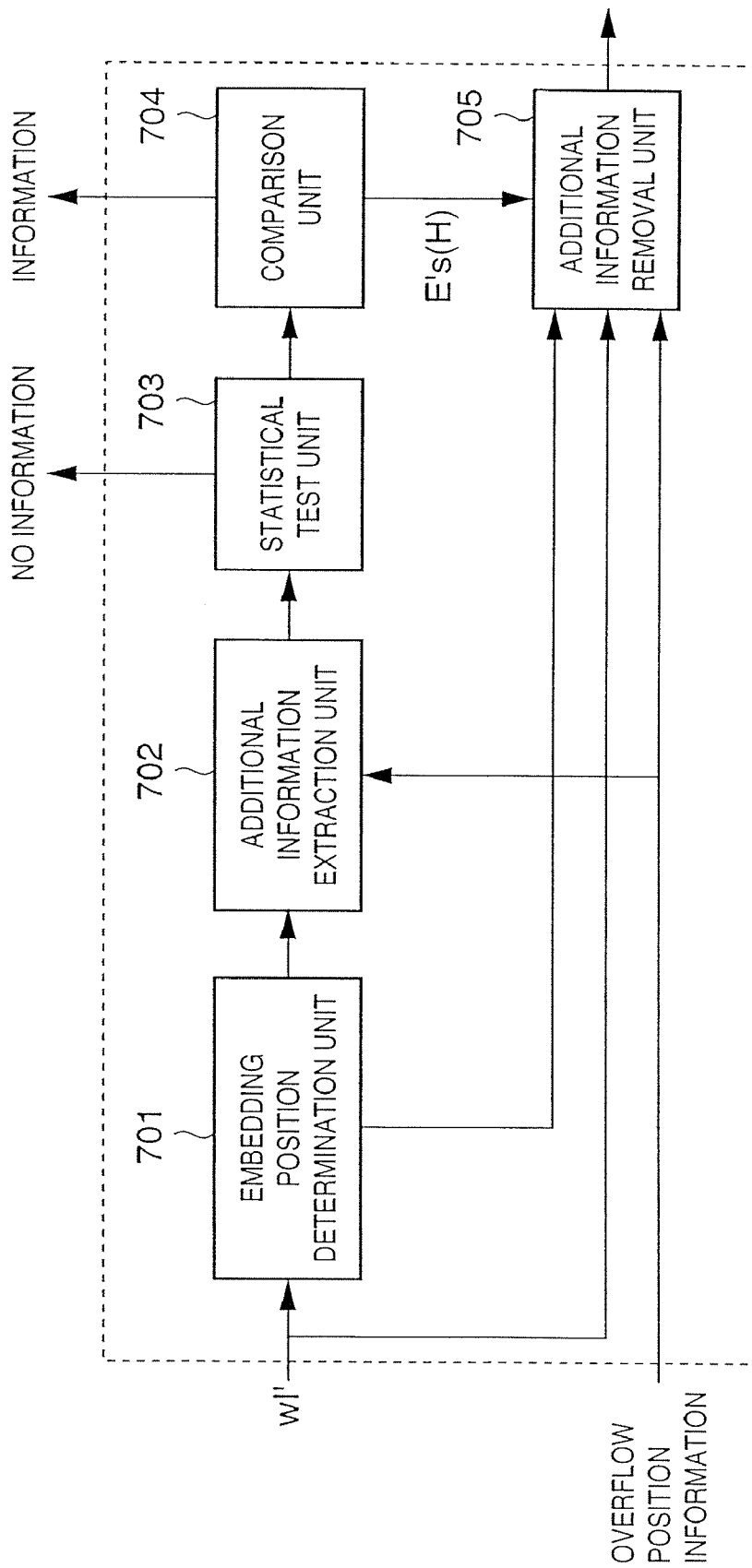
FIG. 7 is a block diagram of a digital watermarking unit in the embodiment of the present invention.

As shown in FIG. 7, the digital watermark extraction unit 302 comprises an embedding position determination unit 701, additional information extraction unit 702, statistical test unit 703, comparison unit 704, and additional information removal unit 705.

The digital watermark extraction unit receives digital watermark embedded data wI'. The embedding position determination unit 701 generates position information where a digital watermark is embedded (the same pattern as the white noise mask used in the digital watermarking unit 204). The additional information extraction unit 702 executes a predetermined process for the digital watermark embedded data on the basis of the input position information where the digital watermark is embedded, thus calculating a reliability distance d corresponding to additional information E's(H) embedded into the image data wI'. The statistical test unit 703 statistically tests the accuracy of data corresponding to the additional information E's(H) calculated by the additional information extraction unit 702. If it is determined that the additional information E's(H) is sufficiently accurate, the comparison unit 704 extracts additional information Es(H). If the additional information is not accurate, "no information" is output. If information is embedded, the additional information removal unit 705 removes a digital watermark using the input image data wI', the embedding position information from the embedding position determination unit 701, and the overflow position information.

The operation of the digital watermark extraction unit for extracting the additional information E's(H) from the image data wI' embedded with the digital watermark will be described in detail below.

<Embedding Position Determination Unit>

The embedding position determination unit 701 determines a region of the image data wI' from which additional information E's(H) is to be extracted. The operation implemented by the embedding position determination unit 701 is the same as that of the embedding position determination unit 401. For this reason, the units 401 and 801 determine identical embedding positions. The determined embedding position information is output to the additional information extraction unit 702 and additional information removal unit 705.

<Additional Information Extraction Unit>

The additional information extraction unit 702 calculates the reliability distance d corresponding to each bit from the embedding position determined by the embedded position determination unit 701. In this case, the unit 702 does not use pixels indicated by the input overflow position information in calculation of the reliability distance d since no additional information is embedded into these pixels.

<Statistical Test Unit>

The statistical test unit 703 statistically tests the accuracy of the reliability distance d corresponding to each bit information output from the additional information extraction unit 702. If a plurality of pieces of bit information are embedded, a plurality of reliability distances d are obtained. If additional information E's(H) is embedded, the reliability distance d appears at a position around a position 2c separated from center 0 in FIG. 6.

At this time, the reliability distance d appears at a position separated farther away from center 0 in FIG. 6 with increasing embedding depth c. Therefore, if a threshold value is introduced at the position of "c", and a reliability distance d larger than "c" is obtained, it is determined that the embedded bit information is "1"; if a reliability distance smaller than −c is obtained, it is determined that the embedded bit information is "0".

Therefore, with increasing embedding depth "c" upon embedding additional information, the spacing between neighboring normal distributions 601, 602, and 603 increases and higher reliability of extracted information is assured. Also, as the number N of elements of subsets A and B is larger, the standard deviation of the normal distributions 601, 602, and 603 decreases. Therefore, by increasing the embedding depth "c" and the number N of elements of subsets A and B, high reliability of extracted information can be set even when a threshold value is "c".

Note that reliability distances d when no information is embedded (are more likely to) appear within a narrow range from −c to c, and such situation is determined by exploiting that fact.

More specifically, when a given number or more of reliability distances d corresponding to a plurality of bits appear within the range from −c to c, the statistical test unit 703 of this embodiment determines that no information is embedded, and displays a message indicating this.

<Comparison Unit>

The comparison unit 704 in FIG. 7 is supplied with values of reliability distances d corresponding to respective pieces of bit information output via the additional information extraction unit 702 and statistical test unit 703.

Since the reliability distances d corresponding to the respective pieces of bit information, which are input to the comparison unit 704 are highly reliable, "1" or "0" need only be simply determined based on the positive or negative sign of the reliability distance d corresponding to each bit information.

More specifically, if the reliability distance d of given bit information that forms additional information E's(H) is larger than "c", it is determined that this bit information is "1"; if the reliability distance d is smaller than "−c", it is determined that this bit information is "0".

<Additional Information Removal Unit>

The operation executed by the additional information removal unit 705 will be explained below. The additional information removal unit 705 receives the embedding positions of additional information E's(H), image data wI', and overflow position information, and outputs image data I' from which the additional information has been removed.

At the same positions as those where the additional information embedding unit 402 in the digital watermarking unit embedded, the embedding depth c is added to subsets corresponding to the respective bits by inverting the sign to that upon embedding, thereby removing additional information and restoring an original image.

More specifically, at the embedded position of predetermined bit information that forms the additional information E's(H), if the bit information is "1", processes $a'_i = a_i - c$ $b'_i = b_i + c$ are executed; if the bit information is "0", processes $a'_i = a_i + c$ $b'_i = b_i - c$ are executed, thus restoring a pixel value before embedding. In this case, the input overflow position information is exploited. Therefore, since no additional information is embedded into a pixel at the overflow position, that pixel does not undergo removal.

The additional information removal unit 705 removes a digital watermark from the digital watermark embedded data wI' by the aforementioned manipulation, and outputs image data I' from which the digital watermark has been removed.

In the aforementioned embodiment, the method of using the digital signature as authentication information has been explained. However, the present invention is not limited to such specific method, and includes, e.g., a method of using an MAC (message authentication code) as authentication information. Furthermore, in addition to the digital signature or MAC, at least one or more of date information, position information, time information, unique information of an apparatus, and unique information of a person who has signed may be included.

Furthermore, in the above embodiment, additional information used may be converted into an error correction code. In this way, the reliability of extracted additional information Inf can be further improved.

Note that most building components of apparatuses on the side of embedding information and on the side of authenticating embedded information can be implemented by software. That is, the respective processing units shown in FIGS. 2 and 3 can be implemented by software.

Figure 1:
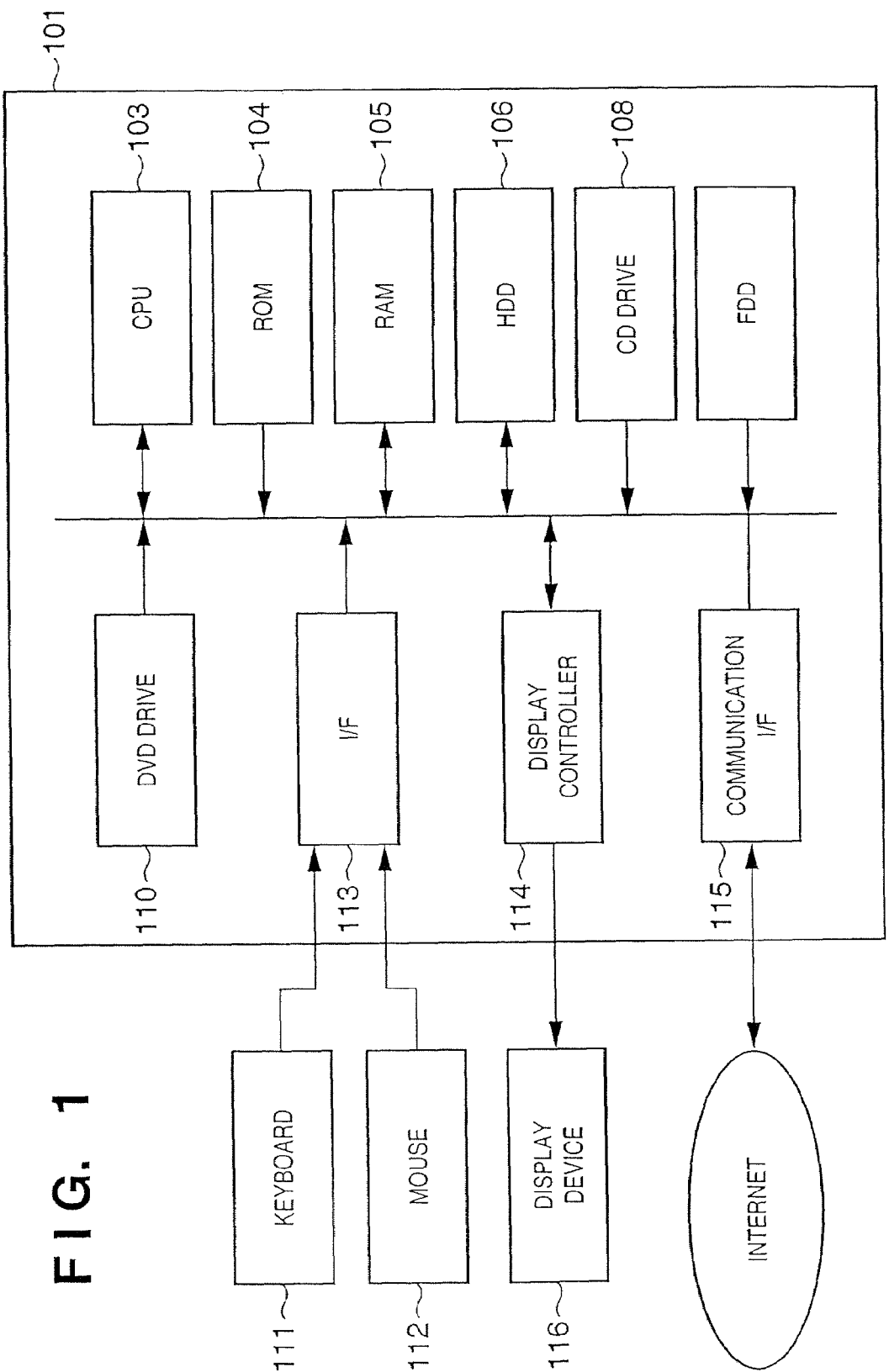
FIG. 1 is a block diagram of a computer that can be applied in an embodiment of the present invention.

In this case, an apparatus arrangement can be a versatile apparatus such as a general personal computer or the like, and for example, an arrangement shown in FIG. 1 can be used.

FIG. 1 shows the overall arrangement of an image processing apparatus which is applied to this embodiment. Referring to FIG. 1, a host computer 101 is, e.g., a generally prevalent personal computer.

Inside the host computer 101, respective blocks to be described below are connected via a bus 107 to exchange various data.

Referring to FIG. 1, reference numeral 103 denotes a CPU which can control the operations of respective internal blocks or can execute internally stored programs. Reference numeral 104 denotes a ROM which stores a boot program and BIOS. Reference numeral 105 denotes a RAM which temporarily stores a program upon executing a process by the CPU or image data to be processed. Reference numeral 106 denotes a hard disk (HD) which can pre-store programs (OS and image processing program) and image data to be transferred to the RAM or the like, and can save processed image data. When the host computer serves as a signature apparatus, the hard disk 106 stores a program corresponding to FIG. 2, which is loaded onto the RAM 105 upon execution. When the host computer serves as an authentication apparatus, the hard disk 106 stores a program corresponding to FIG. 3, which is loaded onto the RAM 105 upon execution.

Reference numeral 108 denotes a CD drive which can load data stored in a CD (CD-R) as one of external storage media or can write data in the CD-R. Reference numeral 109 denotes an FD drive which can load data from an FD and can write data in the FD as in the CD drive 108. Reference numeral 110 denotes a DVD drive which can load data from a DVD and can write data in the DVD as in the CD drive 108. Note that when the CD, FD, DVD, or the like stores an image edit program or printer driver, such program is installed on the HD 106 and is transferred to the RAM 105 as needed. These storage media are used to store an original image and to embed signature information into the stored image, or a signed image stored in the delivered storage medium is authenticated.

Reference numeral 113 denotes an interface (I/F) which is connected to a keyboard 111 and mouse 112 to receive input instructions from them. Reference numeral 114 denotes a display controller which incorporates a graphic controller and video memory (not shown), makes control associated with display, and displays an image by outputting image data mapped on the video memory to a display device 115. Reference numeral 115 denotes a communication interface (e.g., a modem, Ethernet board, or the like) used to connect to the Internet. Information appended with signature information can be sent or received via the communication interface 115.

Note that means for inputting image data is not limited to the aforementioned means, but an image scanner or the like may be used instead.

As described above, according to this embodiment, digital information and signature information can be set in an inseparable state, and the signature information can be sent to the authentication apparatus even via format conversion or the like.

[Description of Modification]

In the above example, the patchwork method has been applied. In the following description, other application examples will be explained.

As described above, "digital watermarking" is known as one of copyright protection techniques. Digital watermarking is a technique for embedding the name of a copyright proprietor or the ID of a purchaser into digital image data, audio data, text data, or the like in an imperceptible form, and tracing use without notice by means of illicit copies. Digital watermarking must have robustness against attacks since it may suffer various attacks.

On the other hand, a technique for extracting information embedded as a digital watermark from an image, and then completely restoring an original image from that image has been proposed. That is, a reversible digital watermarking technique is proposed.

An embedding method is simply expressed by:

$$I'_{j,i} = I_{j,i} + c_j \times a_i \times x_i \quad (1)$$

where j is a positive number indicating the region and the bit position of additional information Inf, i is a positive number indicating the pixel position, $I'_{j,i}$ is the image embedded with the digital watermark, $c_j$ is a constant which assumes +1 if $Inf_j$="1" or −1 if $inf_j$="0", $a_i$ is a weighting coefficient, and $x_i$ is a pseudo random number sequence falling within the range from −1 to +1. $x_i$ is called a carrier signal used to embed a digital watermark.

Upon restoration, the embedded digital watermark is extracted first. Using the extracted digital watermark, an original image is restored by:

$$I''_{j,i} = I'_{j,i} - c_j \times a_i \times x_i \quad (2)$$

where $I''_{j,i}$ is the restored image data, $I'_{j,i}$ is image data input to an image restoration apparatus, $c_j$ is a constant which assumes +1 if the bit in additional information Inf extracted by a digital watermark extraction unit is "1" or −1 if the bit is "0", and $a_i$ and $x_i$ are the same as those in equation (1).

Digital watermarking given by equation (1) and original image restoration given by equation (2) will be described in detail below.

FIG. 14 shows an example of digital watermarking given by equation (1). Respective matrices indicate portions of an image. FIG. 14 shows a case wherein bit information is bit 1, i.e., $c_j$=+1.

On the restoration side, a digital watermark is extracted first. This extraction algorithm will be briefly explained below. The correlation between the pixel values of a 4×4 pixel block of input image I', and a pseudo random number sequence $x_i$ (the same random number sequence as that on the embedding side is generated, as described above) is checked. If the correlation between the input image I' and pseudo random number sequence $x_i$ is high (larger than a pre-set threshold value), it is determined that an embedded bit is "1". On the other hand, if the correlation between the input image I' and $-x_j$ (a result obtained by inverting the signs of respective elements of the pseudo random number sequence) is high, it is determined that an embedded bit is "0". If both correlations are low, it is determined that no digital watermark information is embedded. In FIG. 14, the 4×4 pixel block has been explained. However, since high accuracy cannot be expected if one bit is embedded into only one block, as shown in FIG. 14, such process is done for a plurality of blocks (e.g., n pixel blocks) to improve the overall accuracy. If m bits are embedded, a process for embedding one bit into n pixel blocks can be repeated m times.

After the digital watermark is extracted in this way, a process for removing that watermark information is executed.

Figure 15:
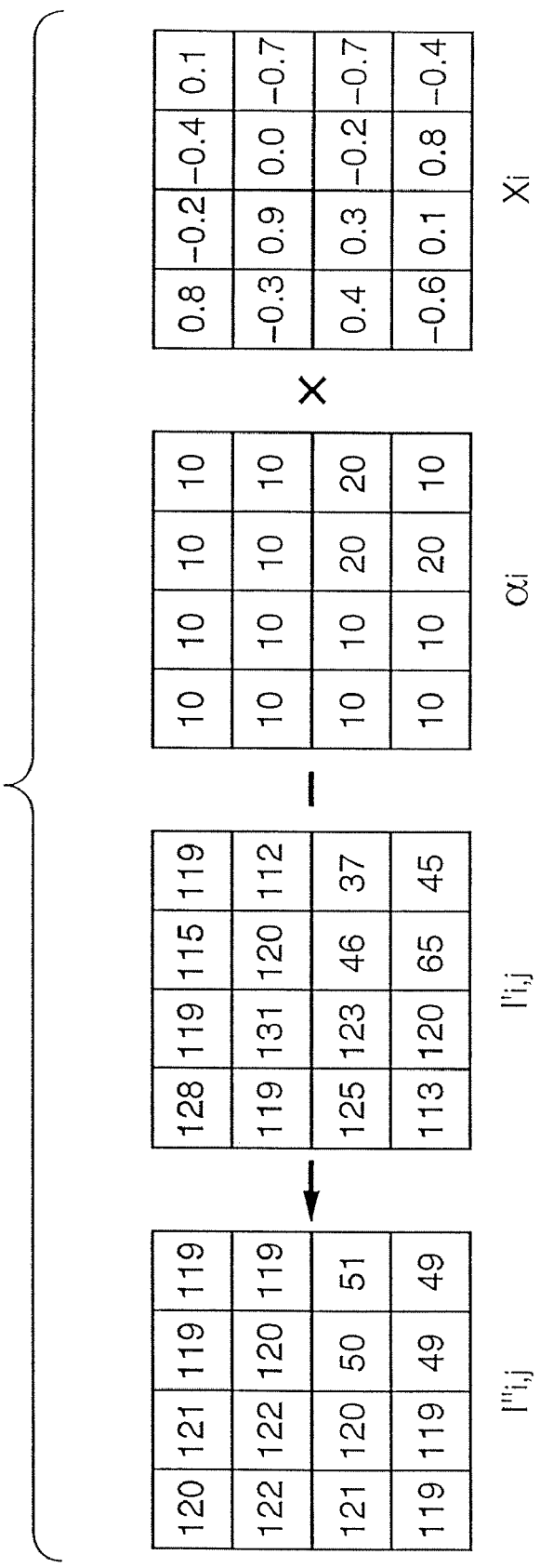
FIG. 15 shows the contents of a process for restoring original data.

FIG. 15 shows an example of removing the digital watermark embedded in the example shown in FIG. 14. In this case, embedded bit information is "1". As shown in FIGS. 14 and 15, it is normally possible to perfectly remove the embedded digital watermark and to restore an original image.

Figure 17:
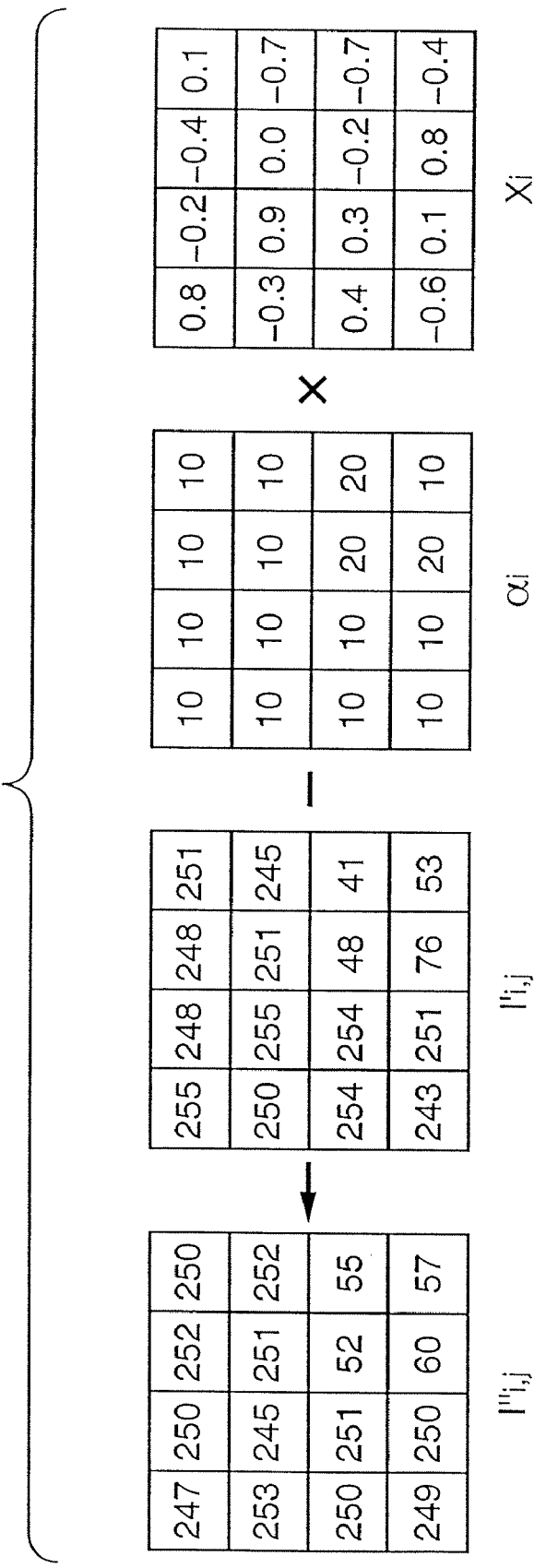
FIG. 17 shows an example wherein original data cannot be restored when overflow has occurred.

On the other hand, FIG. 16 also shows an example of digital watermarking given by equation (1). In the example shown in FIG. 16, image data embedded with a digital watermark includes overflowed pixels (those which have pixel values "262" and "261" after digital watermarking). In this case, a round process shown in FIG. 16 is normally done. A digital watermark can be correctly extracted from an image which does not undergo any round process, but an original image cannot be perfectly restored from portions that have undergone a round process, as shown in FIG. 17.

Basically, it is possible to restore digital data before digital watermarking from digital data embedded with a digital watermark by the aforementioned method, but if overflow has occurred due to digital watermarking, it is impossible to perfectly restore digital data before digital watermarking, as described above. Note that overflow is a phenomenon that if $I_{i,j}$ is expressed by integers (8 bits) ranging from 0 to 255, $I'_{i,j}$ after the process of equation (1) has values falling outside this range. A value smaller than 0 is often rounded to 0, and a value larger than 255 is often rounded to 255. If this round process is executed, it is impossible to perfectly remove a digital watermark by digital watermark removal.

For this reason, it is difficult to perfectly restore original image portions where overflow has occurred.

Hence, this embodiment allows perfect reconstruction of original digital data.

[Digital Watermarking]

A digital watermarking apparatus in this embodiment will be explained below. The digital watermarking apparatus in this embodiment embeds additional information so that image data before digital watermarking can be perfectly restored.

Figure 9:
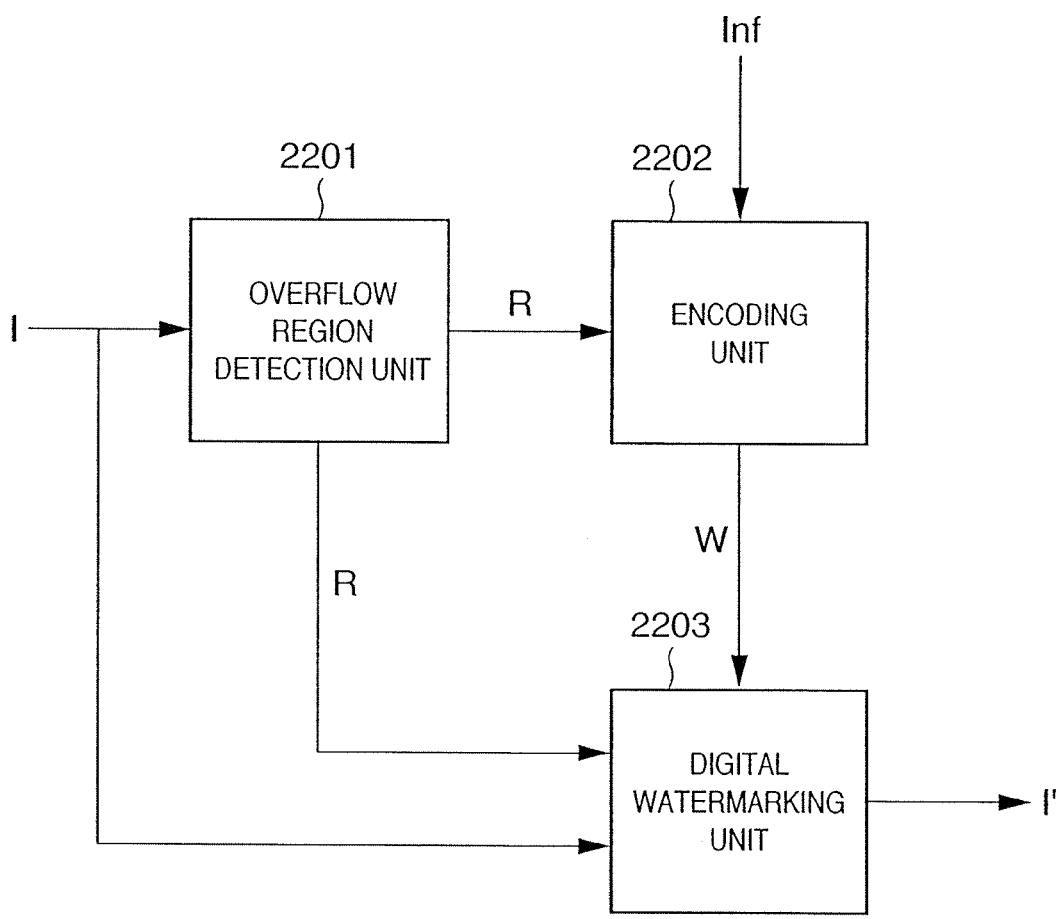
FIG. 9 is a block diagram of a digital watermarking apparatus in another embodiment of the present invention.

FIG. 9 shows the internal arrangement of the digital watermarking apparatus. The flow of the process of the digital watermarking apparatus will be explained below using FIG. 9.

An image I is input to the digital watermarking apparatus. For the sake of simplicity, the image I is grayscale multi-valued image data having 8-bit precision per pixel. However, the present invention is not limited to such specific data, and grayscale multi-valued image data having a predetermined number of bits may be input. Furthermore, when a color image consisting of a plurality of components is input, one or a plurality of components may be selected as an input image or images. The input image I is input to an overflow region detection unit 2201 and digital watermarking unit 2203.

The overflow region detection unit 2201 will be described first. The overflow region detection unit 2201 receives the image I, and detects for all pixels which form the input image I if overflow would occur after the digital watermarking process by the next digital watermarking unit 2203, extracts all pixel positions where overflow would occur, and outputs coordinate information of such pixels together.

In the following description, information of the positions of pixels (zero, one, or more in some cases) where overflow would occur will be referred to as overflow information R. The overflow information R is output to an encoding unit 2202 and the digital watermarking unit 2203. The operation of the overflow region detection unit will be described in more detail later.

The encoding unit 2202 will be described below. The encoding unit 2202 receives the overflow information R and additional information Inf, combines the overflow information R and additional information Inf into a single code sequence, and outputs a combined code sequence w. For example, w has a format shown in FIG. 11. Note that w is used as a code sequence to be embedded as a digital watermark into the image I by the digital watermarking unit 2203. For this reason, in order to implement efficient digital watermarking, w may be compression-encoded. Furthermore, if the additional information Inf is secret information, w may be encrypted. In order to correctly extract the additional information Inf even after the additional information Inf is embedded as a digital watermark and is altered to another information as a result of various attacks, w may be converted into an error correction code. In any case, the pixel positions indicated by the overflow information R are included from the embedding process, and the pixel values of an original image at those positions are used.

The digital watermarking unit 2203 will be described below. The digital watermarking unit 2203 receives the image I, overflow information R, and code sequence w, embeds the code sequence w into the image I as a digital watermark, and outputs an image I' embedded with the digital watermark. Note that pixels indicated by the overflow information R do not undergo digital watermarking. Hence, the digital watermarking unit 2203 never causes any overflow due to its digital watermarking. The operation of the digital watermarking unit 2203 will be described in more detail later.

As described above, the additional information Inf is embedded into the image I as a digital watermark, thus generating the image I' embedded with the digital watermark.

[Image Restoration Apparatus]

Figure 10:
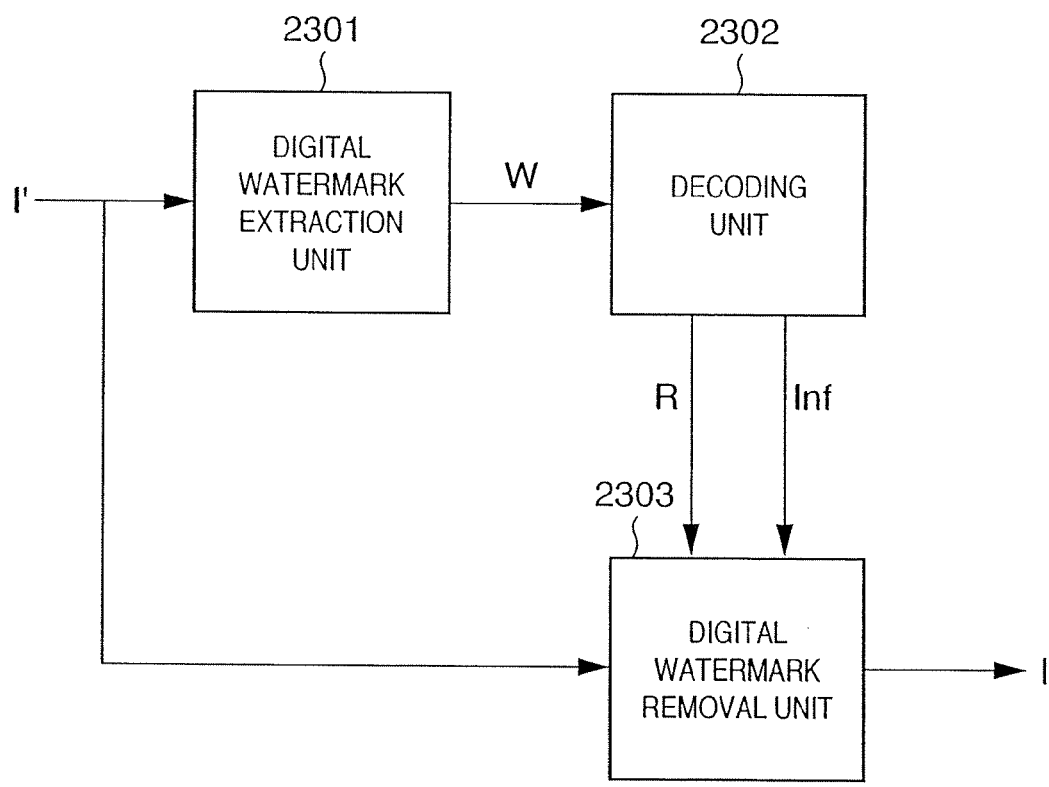
FIG. 10 is a block diagram of an image restoration apparatus in another embodiment of the present invention.

An image restoration apparatus in this embodiment will be described below using FIG. 10. The image restoration apparatus executes a process for perfectly restoring an image embedded with digital watermark to image data before digital watermarking.

The image restoration apparatus receives the image I' embedded with the digital watermark by the aforementioned method. The input image I' is input to a digital watermark extraction unit 2301 and digital watermark removal unit 2303.

The digital watermark extraction unit 2301 will be explained first. The digital watermark extraction unit 2301 receives the image I' embedded with the digital watermark, extracts the embedded code sequence w, and outputs the extracted code sequence w. The digital watermark extraction unit 2301 extracts the digital watermark using all objective pixels of the input image I'. That is, all pixels as well as those, which are indicated by the overflow information R (no digital watermark is embedded at positions described in the overflow information R) and are excluded from digital watermark embedding object, undergo digital watermark extraction. The operation of the digital watermark extraction unit 2301 will be explained in more detail later. The extracted code sequence w is output to a decoding unit 2302.

The decoding unit 2302 will be described below. The decoding unit 2302 receives the code sequence w extracted by the unit 2301, separates it into the overflow information R and additional information Inf which form the code sequence w, and outputs the separated overflow information R and additional information Inf. When the encoding unit 2202 has compression-encoded w, the decoding unit 2302 executes an expansion decoding process. Also, when the encoding unit 2202 has encrypted w, the decoding unit 2302 executes a decryption decoding process for decrypting the encrypted data. Furthermore, when the encoding unit 2202 has converted w into an error correction code, the decoding unit 2302 executes an error correction decoding process for correcting errors. The overflow information R and additional information Inf are output to the digital watermark removal unit 2303.

The digital watermark removal unit 2303 will be described below. The digital watermark removal unit 2303 receives the image I' embedded with the digital watermark, overflow information R, and additional information Inf, restores an original image before digital watermarking from the image I' embedded with the digital watermarking using the additional information Inf, and outputs the restored image I. In this restoration process, pixels indicated by the overflow information R are excluded. This is because no digital watermark is embedded at pixels indicated by the overflow information R by the aforementioned digital watermarking unit 2203. The operation of the digital watermark removal unit 2303 will be described in more detail later.

As described above, the image I before digital watermarking is restored from the image I' embedded with the digital watermark.

[Details of Digital Watermarking Process]

Details of the digital watermarking process will be explained below taking an example.

A case will be examined below wherein n-bit information Inf is embedded into an image I (that is, information w in the above embodiment is embedded). In this case, the image I is broken up into n non-overlapping regions $I_j$ (j=1, 2, . . . , n). Then, a digital watermarking process given by:

$$I'_{j,i} = I_{j,i} + c_j \times a_i \times x_i \quad (3)$$

where j is a positive number which specifies the region, and also the bit position of the additional information Inf, i is a positive number indicating the pixel position, $I'_{j,i}$ is the image embedded with the digital watermark, $c_j$ is a constant +1 if $Inf_j$="1" or −1 if $inf_j$="0", $a_i$ is a weighting coefficient, and $x_i$ is a pseudo random number sequence falling within the range from −1 to +1. $x_i$ is called a carrier signal used to embed a digital watermark is executed.

Let $a_{max}$ be a maximum value (positive value) that the weighting coefficient can assume, and $x_{max}$ be a maximum value (positive value) that $x_i$ can assume. Then, the arithmetic operation given by equation (3) is executed only when a condition $$a_{max} \times x_{max} \leq I \leq 255 - a_{max} \times x_{max} \quad (4)$$

is satisfied.

In this case, since the values of respective elements of $a_i$ and $x_i$ are synchronized and known in both the apparatus for embedding the digital watermark and the apparatus for extracting it, equation (4) may be further developed as:

$$a_i \times x_i \leq I \leq 255 - a_i \times x_i \quad (4')$$

If the condition of equation (4) or (equation (4')) is not met, pixel position i is recorded as the overflow information R. In a general natural image, the number of pixels which do not meet the condition given by equation (4) (i.e., pixels excluded from embedding) is very smaller than the total number of pixels of the entire image. This indicates that the overflow information R has a relatively small information size. Hence, that information size is negligible even when the overflow information R is combined as the code sequence w by the encoding unit 2202, and the code sequence w is then embedded as a digital watermark by the digital watermarking unit 2203. As described above, since a digital watermark is embedded by equation (1) under the condition given by equation (4) (or equation (4')), a digital watermarking process can be executed without overflow.

[Details of Image Restoration Process]

Details of the image restoration process will be explained below taking an example.

The code sequence w is embedded into the input image I' as a digital watermark. In order to extract the digital watermark w using equation (3), PFA is calculated from the carrier signal x used to embed the digital watermark and the image I' input to the digital watermark extraction unit, and whether or not a digital watermark is embedded, and whether a bit is "0" or "1" if it is embedded are determined based on the calculation result.

Note that the PFA is the probability that a digital watermark is incorrectly detected when it is not embedded in practice. To calculate this probability, a scheme called a statistical test is used. The statistical test is the state-of-the-art technique for those who are skilled in the art. For further details of an example using the statistical test upon extracting a digital watermark, refer to I. Pitas, "A method for signature casting on digital images", I.C.I.I.P. Proceedings, pages 215 to 218, September 1996. A test value $q_j$ is calculated for each bit by the statistical test. The test value $q_j$ follows a standard normal distribution which has zero mean and variance=1 when no digital watermark is embedded into digital data, but it follows a normal distribution which has non-zero mean and variance=1 when a digital watermark is embedded into digital data. Whether or not a digital watermark is embedded is determined based on the distance between the calculated test value $q_j$ and 0.

Furthermore, information embedded as a digital watermark can be calculated using the calculated test value $q_j$. When a digital watermark is embedded using equation (3), it is determined that the bit is "1" if $q_j$ is positive, or the bit is "0" if $q_j$ is negative.

As for the principle of extracting a digital watermark, refer to the contents explained in the prior art.

The aforementioned digital watermark extraction process is executed for all pixels as well as those in which no digital watermark is embedded by the digital watermarking unit 2203 since those pixels do not meet the condition given by equation (4) (or equation (4')). Since the number of pixels which do not meet the condition given by equation (4) (or equation (4')) is smaller than the total number of pixels of the entire image, a digital watermark can be correctly extracted even if those pixels are included upon extracting the digital watermark.

The digital watermark extracted in this way is the code sequence w, which is made up of the overflow information R and additional information Inf, and the code sequence w is separated into the overflow information R and additional information Inf. After that, the digital watermark removal unit executes:

If $i \subset R$ then $I''=I'$ else $I''=I'_{j,i}-c_j \times a_i \times x_i$ (5)

where $I''_{i,j}$ is the restored image data, $I'_{i,j}$ is the image data input to the image restoration apparatus, $c_j$ is a constant which assumes +1 if the bit in the additional information Inf extracted by the digital watermark extraction unit is "1" or −1 if the bit is "0", and $a_i$ and $x_i$ are the same as those in equation (3). That is, if i is not included in the overflow information R, a process opposite to equation (3) is executed; if i is included in the overflow information R, no process is executed.

When the code sequence w is correctly extracted by the aforementioned process, the restored image I'' can be equal to the original image I.

[Description of Practical Apparatus]

It is easy for those who are skilled in the art that the apparatus for embedding a digital watermark and the apparatus for extracting the embedded digital watermark and restoring an original image can be implemented by programs which execute the aforementioned processes.

Figure 8:
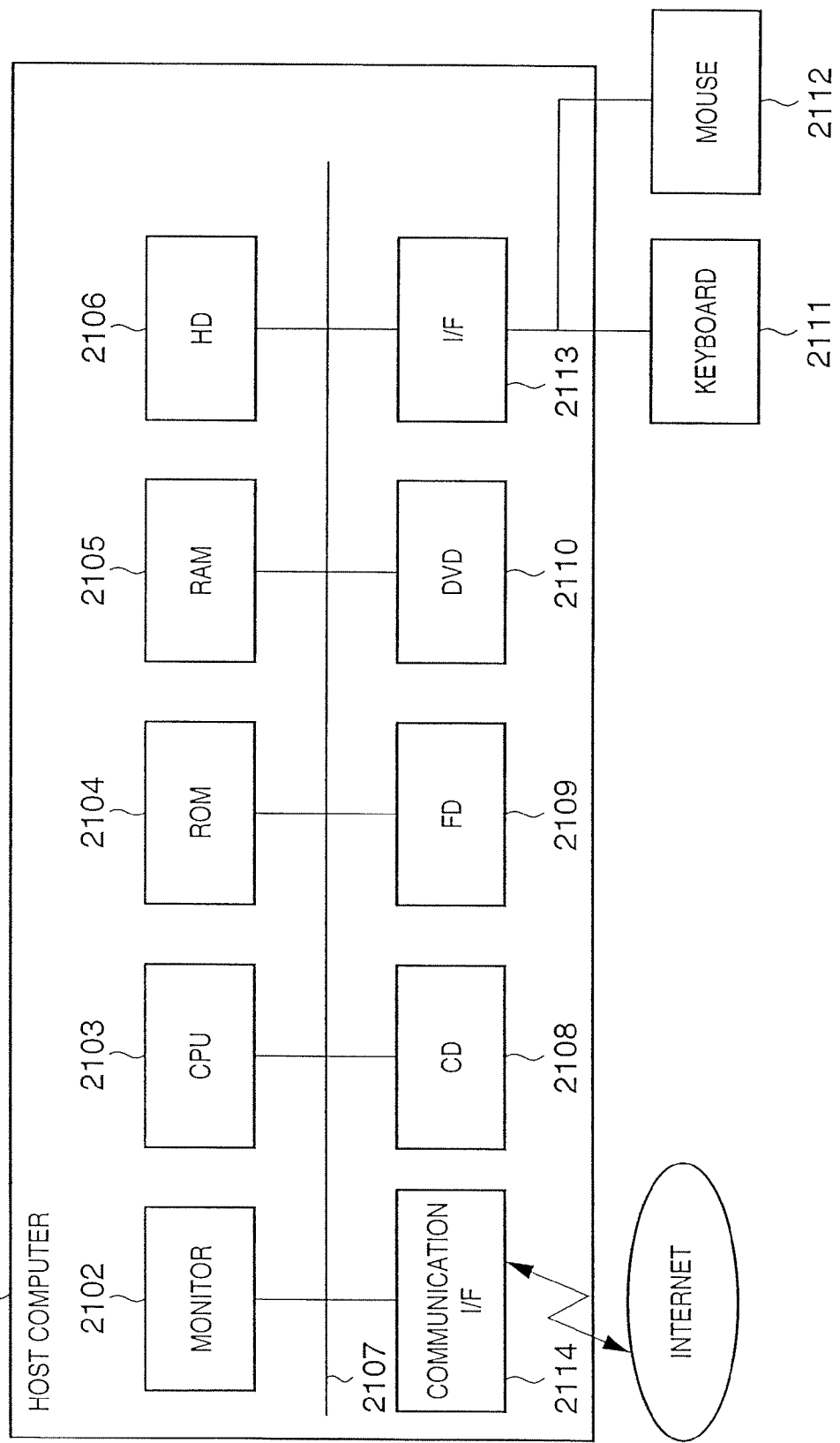
FIG. 8 is a block diagram of an information processing apparatus applied to another embodiment of the present invention.

FIG. 8 shows the practical arrangement of the apparatus, and a process (program) associated with embedding of a digital watermark and a restoration process (program) will be described after the description of FIG. 8.

Referring to FIG. 8, a host computer 2101 is, e.g., a generally prevalent personal computer.

Inside the host computer 2101, respective blocks to be described below are connected via a bus 2107 to exchange various data.

Referring to FIG. 8, reference numeral 2102 denotes a monitor (display device), and 2103, a CPU which can control the operations of respective internal blocks or can execute internally stored programs. Reference numeral 2104 denotes a ROM which stores a boot program and BIOS. Reference numeral 2105 denotes a RAM which temporarily stores a program upon executing a process by the CPU or image data to be processed. Reference numeral 2106 denotes a hard disk (HD) which can pre-store programs (OS and image processing program) and image data to be transferred to the RAM or the like, and can save processed image data.

Reference numeral 2108 denotes a CD drive which can load data stored in a CD (CD-R) as one of external storage media or can write data in the CD-R. Reference numeral 2109 denotes an FD drive which can load data from an FD and can write data in the FD as in the CD drive 2108. Reference numeral 2110 denotes a DVD drive which can load data from a DVD and can write data in the DVD as in the CD drive 2108. Note that when the CD, FD, DVD, or the like stores an image edit program or printer driver, such program is installed on the HD 2106 and is transferred to the RAM 2105 as needed. Reference numeral 2113 denotes an interface (I/F) which is connected to a keyboard 2111 and mouse 2112 to receive input instructions from them. Reference numeral 2114 denotes a communication interface used to connect to a network such as the Internet.

The output destination of an image embedded with a digital watermark may be a storage medium such as an HD, FD, or the like, or may be a file server on the network. The same applies to media that receive information embedded with a digital watermark.

Figure 18:
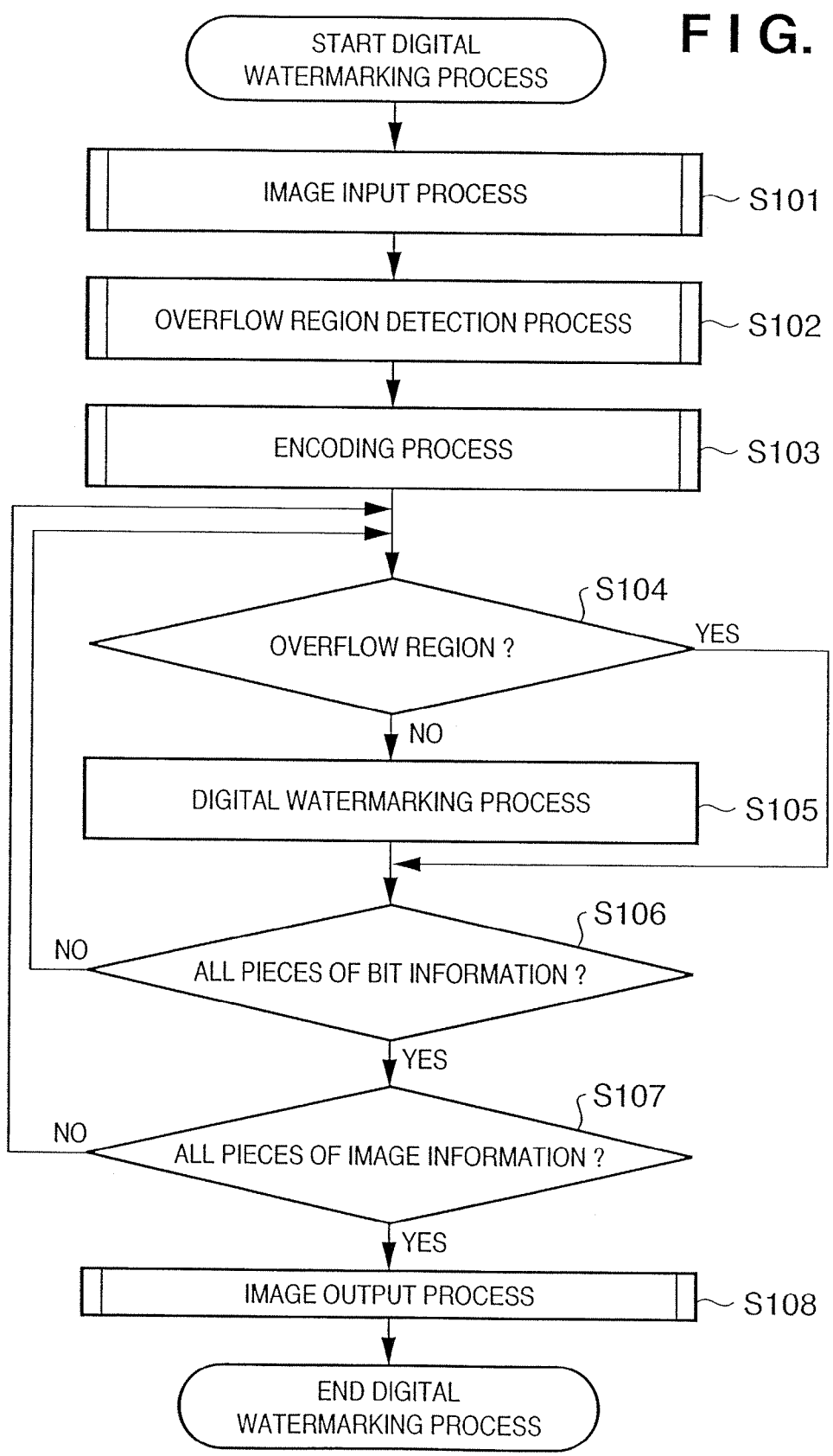
FIG. 18 is a flow chart showing a digital watermarking sequence in another embodiment of the present invention.

When the aforementioned apparatus serves as a digital watermark embedding apparatus, a process is executed according to the sequence shown in FIG. 18. Note that a program associated with the sequence to be described below is installed on the HD 2106. Also, information Inf to be embedded is input from, e.g., the keyboard. Alternatively, information stored in advance in the HD 2106, ROM 2104, RAM 2105, or the like may be used.

In step S101, image data in which a digital watermark is to be embedded is input. The input source is not particularly limited, and the image data may be downloaded via a network or may be input using an image scanner or the like. In step S102, all overflow pixel positions are detected from the input image data, and are saved as overflow information R in the RAM 2105. Additional information Inf input in advance and the overflow information R are combined and encoded (by reversible coding) to generate information w to be embedded in practice, which information is temporarily saved in the RAM 2105.

Each of pixels of the input image data is selected as a pixel of interest, and it is checked if the pixel position of interest is included in the overflow information R. If that pixel position is not included in the overflow information R, 1 bit is extracted from the information W, and a digital watermarking process according to that bit state is executed.

On the other hand, if the pixel position of interest is included in the overflow information R, no digital watermarking process is executed.

This process is repeated for all pieces of bit information and all pixels (steps S106 and S107). Upon completion of the process for all pieces of bit information and all pixels, the image data embedded with the digital watermark is output to the RAM 2105 or HD 2106 (step S108).

If embedding of all bits of the information W is completed before completion of embedding for all pixels, dummy information may be embedded or the information w may be embedded repetitively.

As a result, image information I' after embedding is generated on the RAM. This image I' is finally stored in, e.g., the HD or the like as a file. After that, the image I' may be transferred via the network or may be stored in, e.g., a removable medium.

Figure 19:
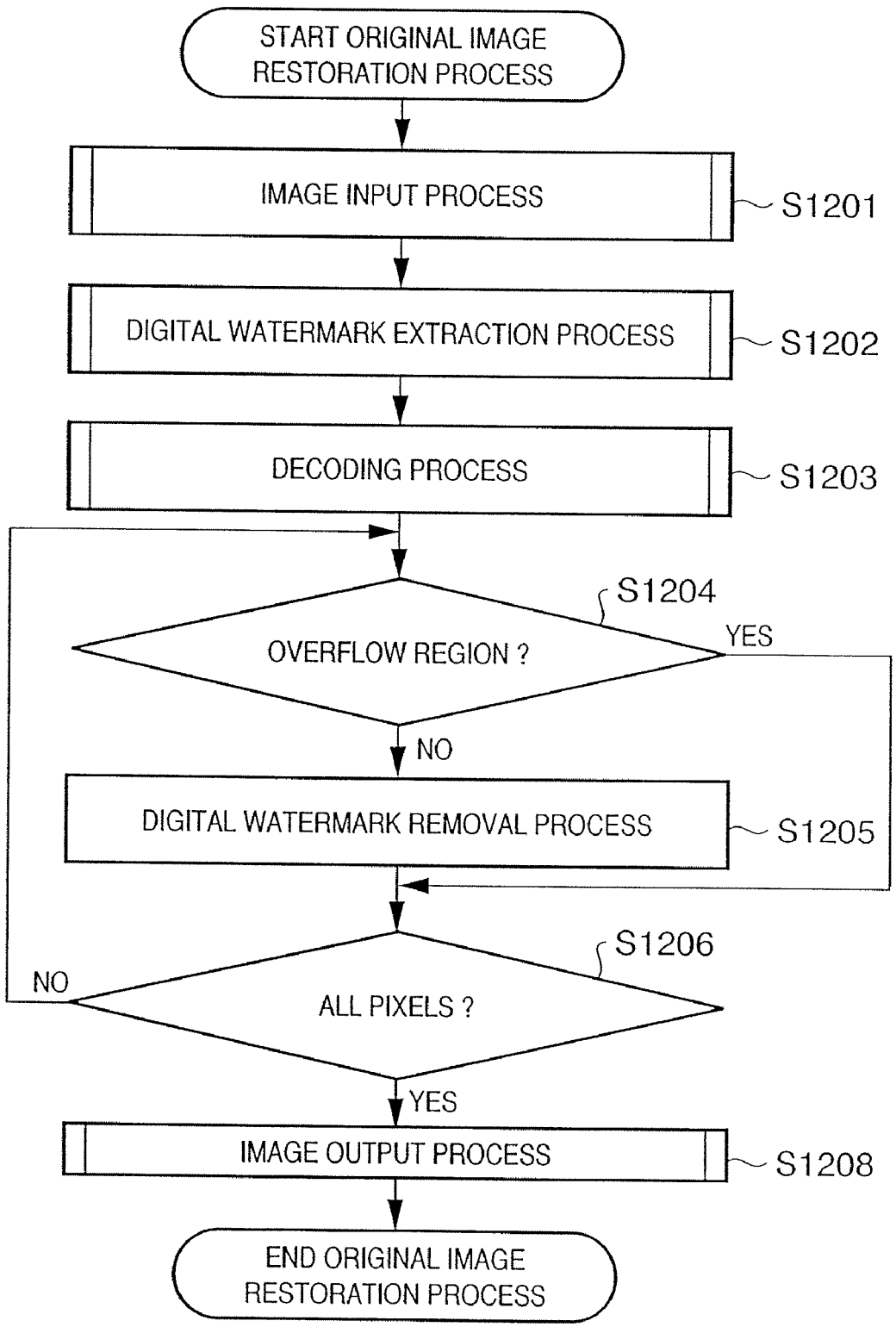
FIG. 19 is a flow chart showing an original data restoration sequence in another embodiment of the present invention.

The process for extracting the digital watermark and restoring an original image will be explained below using FIG. 19.

The image data I' embedded with the digital watermark is input to the RAM 2105 (step S1201). As described above, the input source is not particularly limited. After that, digital watermark information is extracted from the embedded image I' in step S1202. The extraction principle of the digital watermark is as has been described above.

In step S1203, the extracted information is decoded to store information w (=overflow information R+embedded information Inf) in the RAM 2105, thus completing the extraction process. Note that the embedded information Inf may be displayed on the display screen.

In step S1204, each of pixels of the image data is selected as a pixel of interest, and it is checked if the pixel position of interest is included in the overflow information R.

If the pixel of interest is not included in the overflow information R, a digital watermark removal process is executed in step S1205.

On the other hand, if the pixel of interest is included in the overflow information R, a digital watermark removal process for that pixel is skipped, and the pixel value of the input image data is used.

This process is executed for all pixels (step S1206). By removing a digital watermark upon completion of the process for all the pixels, an original image is reconstructed. This result (original image data) is output to the RAM 2105, HD 2106, or the like, and is displayed as needed.

In the above embodiment, the number of overflow pixels is relatively smaller than the total number of pixels of the entire image. That is, the information size of the overflow information R is relatively small, and is relatively desirable to embed the information R together with a digital watermark. For example, this case applies to a natural image such as a photo or the like.

On the other hand, the overflow information R may have a large information size depending on the type of image data. For example, when a digital watermark is embedded in a luminance value, the overflow information R becomes large when the entire luminance of an image is high or low.

When the information size of the overflow information R becomes too large, the information size of the code sequence w that contains the overflow information R also becomes large, and the code sequence w cannot be embedded as a digital watermark. Hence, the information size of the overflow information R is preferably minimized. An example of a process for reducing the size of the overflow information R will be explained below.

Figure 12:
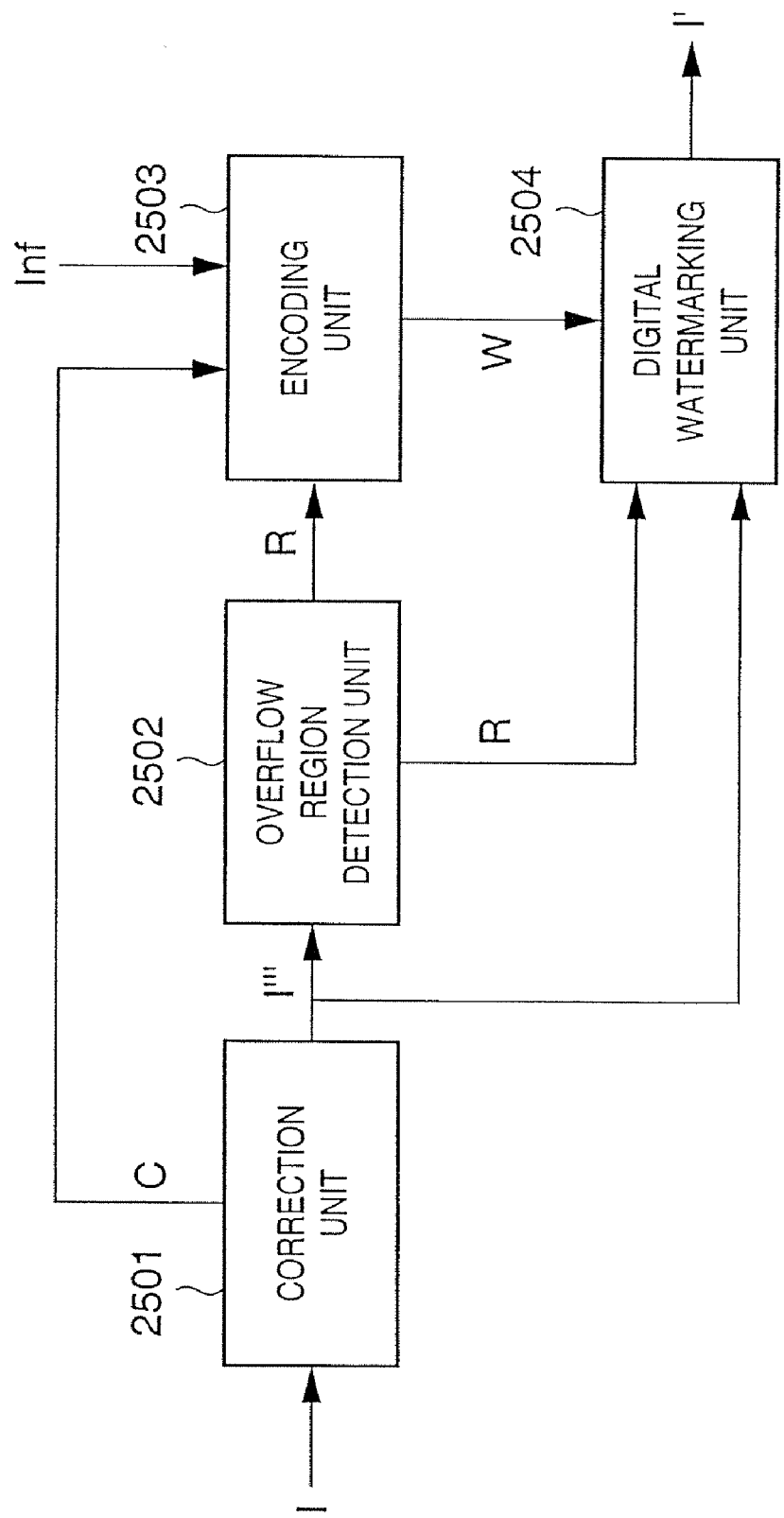
FIG. 12 is a block diagram of a digital watermarking apparatus in still another embodiment of the present invention.

FIG. 12 shows the internal arrangement of the digital watermarking apparatus. The differences from the apparatus shown in FIG. 9 are addition of a correction unit 2501, and the processing contents of the encoding unit 2503. Since other operations are the same as those in FIG. 9, a description thereof will be omitted.

Image data I is input to the correction unit 2501, which executes a correction process to reduce the information size of the overflow information R, and outputs corrected image data I''' and correction information C indicating the type of correction executed.

The correction process is a process for reducing the information size of the overflow information R. For example, when the luminance of the entire image is high, a process for subtracting a given amount (d) from all the pixel values is executed. In this case, information indicating that "the given amount (d) is subtracted from the pixel values of the entire image" is output as the correction information C.

Furthermore, the encoding unit 2503 encodes the correction information C in addition to the overflow information R and additional information Inf. The encoded code sequence w contains the correction information C, overflow information R, and additional information Inf, as shown in FIG. 20.

The digital watermark is embedded by the aforementioned process. The image restoration apparatus will be explained below.

Figure 13:
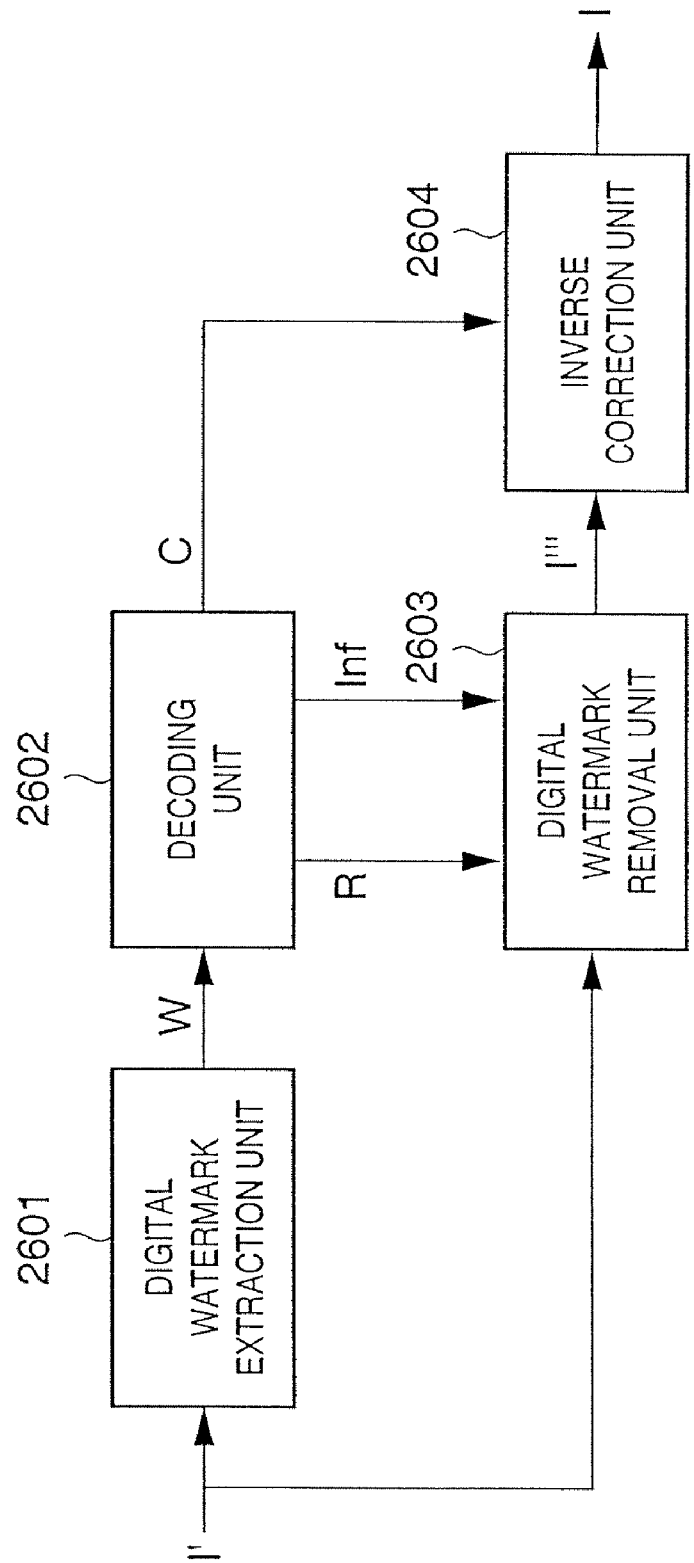
FIG. 13 is a block diagram of an image restoration apparatus in still another embodiment of the present invention.

FIG. 13 shows the internal arrangement of the image restoration apparatus in this embodiment. The differences from the apparatus shown in FIG. 10 are addition of an inverse correction unit 2604, and the processing contents in a decoding unit 2602. Since other operations are the same as those in FIGS. 13 and 10, a description thereof will be omitted.

The decoding unit 2602 receives the code sequence w extracted by a digital watermark extraction unit 2601, decodes the input sequence w to obtain additional information Inf, overflow information R, and correction information C, which are output.

The inverse correction unit 2604 receives image data I''' from which the digital watermark has been removed by the digital watermark removal unit, and the correction information C decoded by the decoding unit 2602, and executes a process opposite to that executed in the correction unit 2503, and outputs corrected image data I. For example, if information indicating that "the given amount (d) is subtracted from the pixel values of the entire image" is input as the correction information C, the correction unit 2604 executes a process for adding the given amount (d) to the pixel values of the entire image.

With the above process, image data I before digital watermarking can be perfectly restored from image data I' input to the image restoration apparatus.

An example of the determination method of the correction information C will be explained below.

The luminance distribution of an image in which a digital watermark is to be embedded is checked. For example, if the frequency of occurrence of high luminance values is larger than that on the low luminance side, correction is made to shift the luminance to the low luminance side. Conversely, if the frequency of occurrence of low luminance values is larger than that on the high luminance side, correction is made to shift the luminance to the high luminance side.

In some cases, the following process may be done. For the sake of easy understanding, a case will be examined below wherein a paper sheet printed with text is read using an image scanner (8 bits per pixel), and the read image is used as image I.

Figure 21:
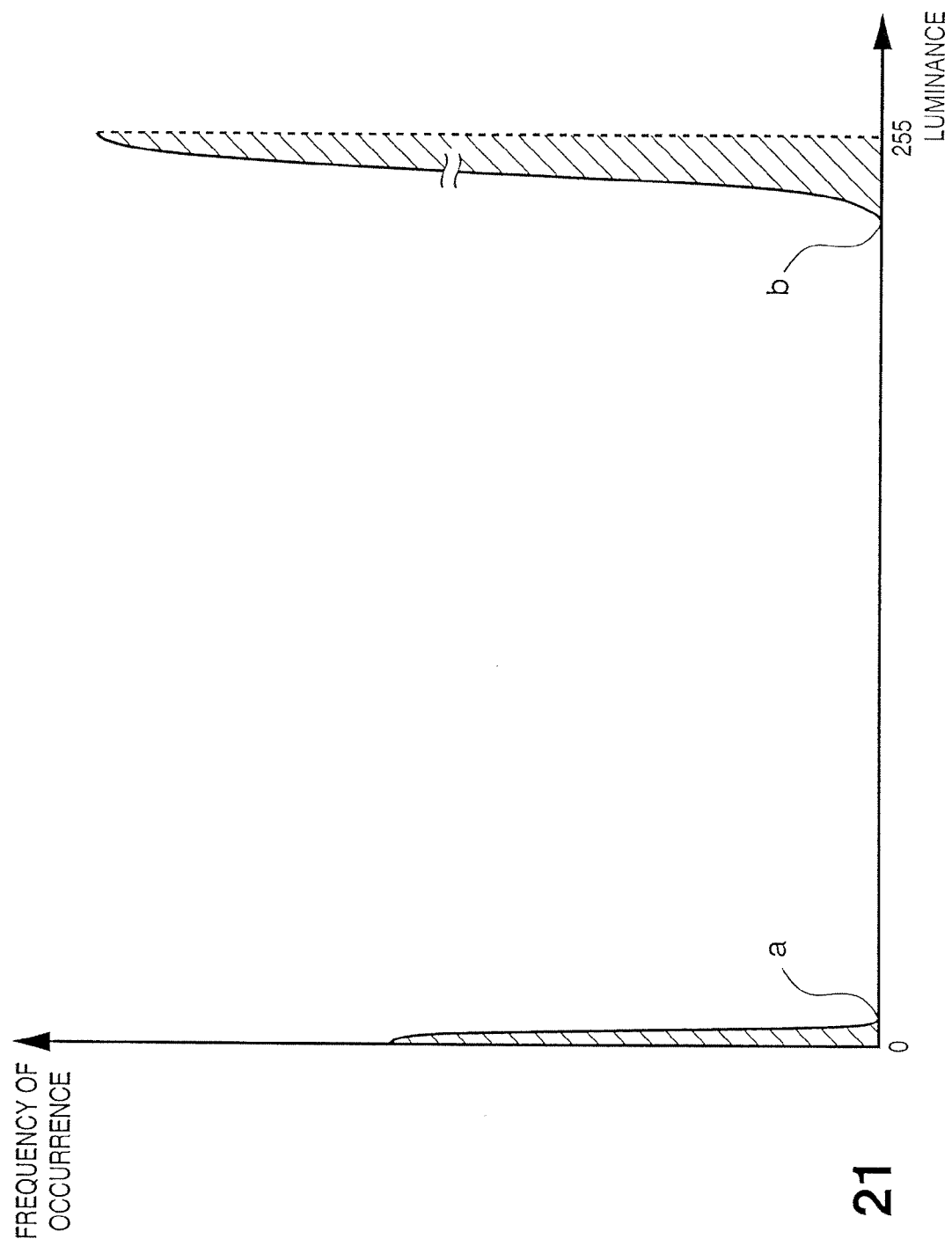
FIG. 21 shows an example of the pixel distribution used to explain a correction process in still another embodiment of the present invention.

Normally, when a document (binary image) printed with text is read and respective pixels are expressed as luminance values, the pixel distribution is concentrated on the highest and lowest luminance values, and nearly no pixels are present therebetween, as shown in FIG. 21.

Under such circumstance, if a given value is evenly added to or subtracted from all pixels, overflow occurs on the high or low luminance side. Hence, the following process is executed.

Since the low luminance range is distributed to luminance values 0 to a, intermediate luminance values which correspond to zero frequency of occurrence and meet equation (4) (or equation (4')) are found out, and the low luminance values are replaced by the found luminance values. For example, if luminance values 50 to 50+a are found out, luminance values 0 to a are converted into values 50 to 50+a (0 is converted into 50, 1 to 51, . . . ). A similar process is done for the high luminance range. That is, the high luminance range is shifted to a lower luminance range.

As a result of the above processes, especially in case of a binary image such as text or the like, if the correction information C indicates the converted values of luminance values 0 to a and luminance values b to 255, an original image can be perfectly restored. In the above description, the image is expressed by luminance components. However, the present invention is not limited to this, and an image may be expressed by other components such as density components or the like.

As described above, according to the above embodiment, when overflow pixels (elements of digital data) are excluded from an embedding process, and information is embedded into non-overflow pixels as a digital watermark, original image data can be perfectly restored.

Note that the present invention can be implemented by a program which runs on a computer, as described above. Hence, the present invention includes a computer program. Since the present invention can be achieved by supplying a program to a computer, means for supplying the program code to the computer, i.e., a storage medium that stores the program code is also included in the scope of the present invention.

As such storage medium that stores the program code, for example, a floppy disk, hard disk, optical disk, magnetooptical disk, CD-ROM, magnetic tape, nonvolatile memory card, ROM, or the like can be used.

Such program code is included in the scope of the present invention not only when the functions of the above embodiments are implemented by the computer which controls various devices in accordance with the supplied program code alone but also when the functions of the embodiments are implemented in collaboration of the program code and an OS (operating system) running on the computer or another application software.

Furthermore, the scope of the present invention includes a case wherein the supplied program code is stored in a memory equipped on a function expansion board of a computer or a function expansion unit connected to the computer, a CPU equipped on that function expansion board or unit then executes some or all of actual processes on the basis of the instructions of that program code, and the embodiments are implemented by these processes.

As described above, according to the present invention, whether or not information has been tampered with can be detected while authentication information is set to be inseparable from digital information, and original digital data can be restored as long as it is free from tampering.

A digital watermark can be embedded, and original digital data in which the digital watermark is embedded can be reconstructed.

As many apparently widely different embodiments of the present invention can be made without departing from the spirit and scope thereof, it is to be understood that the invention is not limited to the specific embodiments thereof except as defined in the appended claims.

What is claimed is:

1. An information embedding apparatus for embedding additional information into elements which form digital data by adding/subtracting a value to/from the elements, comprising:
   detection means for detecting an element which has a value that exceeds a range the element can assume after addition/subtraction;
   generation means for generating actual embedding information by combining the additional information and the information detected by said detection means; and
   embedding means for excluding the element which exceeds the range the element can assume after addition/subtraction from an embedding process upon embedding into the digital data, and embedding the actual embedding information generated by said generation means into the elements, which fall within the range the element can assume, as a digital watermark.

2. The apparatus according to claim 1, wherein the digital data is image data, and
   said detection means detects a pixel position where a pixel value exceeds a range the pixel value can assume after addition/subtraction.

3. The apparatus according to claim 1, further comprising encoding means for compression-encoding at least one of the additional information and the information detected by said detection means, and wherein said generation means generates the actual embedding information on the basis of an encoding result of said encoding means.

4. The apparatus according to claim 1, further comprising encryption means for encrypting at least one of the additional information and the information detected by said detection means, and wherein said generation means generates the actual embedding information on the basis of an encryption result of said encryption means.

5. The apparatus according to claim 1, further comprising encoding means for converting at least one of the additional information and the information detected by said detection means into an error correction code, and wherein said generation means generates the actual embedding information on the basis of a conversion result of said encoding means.

6. The apparatus according to claim 1, further comprising correction means for correcting the digital data to reduce the number of elements, which have values that exceed the range the element can assume after addition/subtraction, in the digital data, and
   wherein said generation means generates the actual embedding information by embedding information indicating correction contents of said correction means.

7. An information restoration apparatus for receiving digital data in which information is embedded by an information embedding apparatus cited in claim 1, and restoring original digital data, comprising:
   digital watermark extraction means for extracting information embedded into the input digital data; and
   digital watermark removal means for removing the embedded information, from the elements which have undergone an embedding process, on the basis of information which specifies elements excluded from the embedding process, and restoring original digital data.

8. The apparatus according to claim 7, further comprising decoding means for expanding and decoding at least one of the additional information extracted by said digital watermark extraction means, the information indicating the elements excluded from the embedding process, and
wherein said digital watermark removal means removes a digital watermark on the basis of a result decoded by said decoding means.

9. The apparatus according to claim 7, further comprising decoding means for decrypting and decoding at least one of the additional information extracted by said digital watermark extraction means, the information indicating the elements excluded from the embedding process, and
wherein said digital watermark removal means removes a digital watermark on the basis of a result decoded by said decoding means.

10. The apparatus according to claim 7, further comprising decoding means for decoding an error correction code of at least one of the additional information extracted by said digital watermark extraction means, the information indicating the elements excluded from the embedding process, and
wherein said digital watermark removal means removes a digital watermark on the basis of a result decoded by said decoding means.

11. A computer readable medium storing a computer program to make the computer function as an information restoration apparatus for receiving digital data in which information is embedded by an information embedding apparatus cited in claim 1, and restoring original digital data, comprising:
a program code of the digital watermark extraction step of extracting information embedded into the input digital data; and
a program code of the digital watermark removal step of removing the embedded information, from the elements which have undergone an embedding process, on the basis of information which specifies elements excluded from the embedding process, and restoring original digital data.

12. A storage medium storing a computer program cited in claim 11.

13. A method of controlling an information embedding apparatus for embedding additional information into elements which form digital data by adding/subtracting a value to/from the elements, comprising:

the detection step of detecting an element which has a value that exceeds a range the element can assume after addition/subtraction;
the generation step of generating actual embedding information by combining the additional information and the information detected in the detection step; and
the embedding step of excluding the element which exceeds the range the element can assume after addition/subtraction from an embedding process upon embedding into the digital data, and embedding the actual embedding information generated in the generation step in the elements, which fall within the range the element can assume, as a digital watermark.

14. A method of controlling an information restoration apparatus for receiving digital data in which information is embedded by an information embedding apparatus cited in claim 1, and restoring original digital data, comprising:
the digital watermark extraction step of extracting information embedded into the input digital data; and
the digital watermark removal step of removing the embedded information, from the elements which have undergone an embedding process, on the basis of information which specifies elements excluded from the embedding process, and restoring original digital data.

15. A computer readable medium storing a computer program to make the computer function as an information embedding apparatus for embedding additional information into elements which form digital data by adding/subtracting a value to/from the elements, comprising:
a program code of the detection step of detecting an element which has a value that exceeds a range the element can assume after addition/subtraction;
a program code of the generation step of generating actual embedding information by combining the additional information and the information detected in the detection step; and
a program code of the embedding step of excluding the element which exceeds the range the element can assume after addition/subtraction from an embedding process upon embedding into the digital data, and embedding the actual embedding information generated in the generation step into the elements, which fall within the range the element can assume, as a digital watermark.

16. A storage medium storing a computer program cited in claim 15.

* * * * *